(12) United States Patent
Moldover et al.

(10) Patent No.: US 8,123,399 B2
(45) Date of Patent: Feb. 28, 2012

(54) DIELECTRIC RESONATOR THERMOMETER AND A METHOD OF USING THE SAME

(75) Inventors: Michael R Moldover, Bethesda, MD (US); Dean Ripple, Gaithersburg, MD (US); Gregory Strouse, Frederick, MD (US)

(73) Assignee: The United States of America as represented by the National Institute of Standards and Technology, Washington, DC (US)

(*) Notice: Subject to any disclaimer, the term of this patent is extended or adjusted under 35 U.S.C. 154(b) by 725 days.

(21) Appl. No.: 12/113,340

(22) Filed: May 1, 2008

(65) Prior Publication Data

US 2008/0285617 A1    Nov. 20, 2008

Related U.S. Application Data

(60) Provisional application No. 60/916,577, filed on May 8, 2007, now abandoned.

(51) Int. Cl.
*G01J 5/44* (2006.01)
*G01K 11/26* (2006.01)
*G01R 27/00* (2006.01)

(52) U.S. Cl. ........ 374/122; 374/118; 374/163; 374/208; 374/184; 600/410; 324/642

(58) Field of Classification Search .......... 374/117–119, 374/100, 122, 141, 184, 120, 208; 702/130–136; 331/65–66, 68–70; 324/633, 636, 639, 642; 600/474, 549, 410
See application file for complete search history.

(56) References Cited

U.S. PATENT DOCUMENTS

| | | | | |
|---|---|---|---|---|
| 3,061,791 A | * | 10/1962 | Zaleski | 329/355 |
| 4,377,733 A | * | 3/1983 | Yamaguchi et al. | 219/713 |
| 4,398,115 A | * | 8/1983 | Gagnepain et al. | 310/313 A |
| 4,568,200 A | * | 2/1986 | Hatono et al. | 374/122 |
| 4,628,283 A | * | 12/1986 | Reynolds | 331/68 |
| 4,799,378 A | * | 1/1989 | Portman et al. | 73/54.27 |
| 5,059,914 A | * | 10/1991 | Lacombe et al. | 324/642 |
| 5,105,158 A | * | 4/1992 | Fiedziuszko et al. | 324/693 |

(Continued)

FOREIGN PATENT DOCUMENTS

EP    0 643 874 B1    3/1995

(Continued)

OTHER PUBLICATIONS

G J Dick and J Saunders, "Measurement and Analysis of a Microwave Oscillator . . . " IEEE Transactions on ultrasonic, ferroelectrics, and frequency control vol. 37 (1990).

(Continued)

*Primary Examiner* — Gail Verbitsky
(74) *Attorney, Agent, or Firm* — Berenato & White, LLC

(57) ABSTRACT

A thermometer is provided. A housing has at least one opening. A dielectric element is disposed in the housing. At least one microwave guide is coupled to the at least one opening for providing a signal into the dielectric element for propagation at a resonant frequency and for receiving the signal from the dielectric element. A temperature determination unit receives the signal from the at least one microwave guide, measures the resonant frequency of the dielectric element, and determines the temperature of the dielectric element based on a relationship between resonant frequency and temperature of the dielectric element.

21 Claims, 22 Drawing Sheets

U.S. PATENT DOCUMENTS

| | | | |
|---|---|---|---|
| 5,115,210 A * | 5/1992 | Cummings et al. | 331/99 |
| 5,285,067 A * | 2/1994 | Culbertson et al. | 250/336.2 |
| 5,652,556 A | 7/1997 | Flory et al. | |
| 5,781,011 A * | 7/1998 | Scholes et al. | 324/316 |
| 5,909,160 A | 6/1999 | Dick et al. | |
| 5,990,767 A | 11/1999 | Ivanov et al. | |
| 6,059,922 A * | 5/2000 | Yamazaki et al. | 156/345.37 |
| 6,297,715 B1 * | 10/2001 | Fiedziuszko et al. | 333/209 |
| 6,549,104 B1 | 4/2003 | Ghosh et al. | |
| 6,719,068 B2 * | 4/2004 | Jonsson | 175/19 |
| 7,048,732 B2 * | 5/2006 | Ellingsen | 606/20 |
| 7,292,112 B2 | 11/2007 | Oxborrow | |
| 7,637,656 B2 * | 12/2009 | Billington et al. | 374/120 |
| 2008/0024119 A1 * | 1/2008 | Gualtieri | 324/207.15 |
| 2008/0175300 A1 * | 7/2008 | Billington et al. | 374/117 |
| 2008/0272114 A1 * | 11/2008 | Taguchi et al. | 219/690 |

FOREIGN PATENT DOCUMENTS

| | | |
|---|---|---|
| EP | 0 923 151 B1 | 6/1999 |
| WO | WO 2005/104348 | 11/2005 |

OTHER PUBLICATIONS

Tobar and Mann "Resonant Frequencies of Higher Order Modes in Cylindrical . . . " IEEE Transactions on ultrasonic, ferroelectrics, and frequency control vol. 39:2 (1991).

Tobar, Ivanov, Blondy, Cros, and Guillon "High-Q Whispering Gallery Traveling . . . " IEEE Transactions on ultrasonic, ferroelectrics, and frequency control vol. 47:421 (2000).

McNeilage, Searls, Ivanov, Stockwell, Green, Mossammaparast, "Advanced . . . " IEEE Trans. on ultrasonic, ferroelectrics, and frequency control volume Society Newlsetter (2005).

Lajoie, Barhaaila, Kersale, Cros, Duchiron, and Giordano, "High Q microwave resonators using quartz monocrystal" Electronics Letters vol. 36:150 (2000).

Giordano and Barhaila and Cros and Duchiron, "High Q SiO2 Whispering Gallery Mode Resonator" Proc. EFTF-IEEE IFCS Joint meeting (1999), pp. 593-596.

Tobar; Ivanov; Woode "Tunable Microwave Oscillator for Low Phase Noise Application" J. Phys. D: Applied Phys (1997) vol. 30 p. 2770.

Giordano and Kersale', Lardet, Lajoie, and M. Chaubet, "Thermal Stabilization of Microwave Sapphire Resonator . . . " Eur. Phys J. AP vol. 8, p. 269 (1999 Joint Meeting).

E Ivanov, D.G. Blair, and V.I. Kalinichev, "Approximate Approach to the Deisgn of Shielded Dielectric . . . " IEEE Transactions on Microwave Theory and Techniques, 41:632 (1993).

Ivanov, Tobar, Woode "A Study of Noise Phenomena in Microwave . . . " IEEE transactions on Ultrasonics, Ferr., and Freq. Contr. vol. 44, No. 1, Jan. 1997 161-163.

* cited by examiner

DIELECTRIC RESONATOR THERMOMETER AND A METHOD OF USING THE SAME

CROSS-REFERENCE(S) TO RELATED APPLICATIONS AND CLAIMS TO PRIORITY

The present application claims priority from U.S. Provisional Patent Application No. 60/916,577 filed May 8, 2007 now abandoned, the contents of which are incorporated herein by reference and to which priority is claimed.

FIELD OF THE INVENTION

The present invention relates to a dielectric resonator thermometer operating in the whispering gallery mode or a Bragg reflector mode, a thermometry system, and a method of using the same.

BACKGROUND OF THE INVENTION

Presently, various types of thermometers exist for industrial applications. The most commonly used industrial thermometer is the platinum resistance thermometer (PRT) for temperatures ranging from −196° C. to 500° C. when measurement uncertainties of less than or equal to 10 mK (millikelvin) are required. The platinum resistance thermometer exploits a predictable change in electrical resistance of platinum with changing temperature. Platinum resistance thermometers offer high accuracy, low drift, a wide operating range, and suitability for applications that require precise measurements.

However, platinum resistance thermometers are extremely sensitive to mechanical shock in handling and shipping. Shocks change the physical state of the annealed, loosely supported platinum resistance element. These changes often prevent a platinum resistance thermometer from meeting the measurement uncertainty [10_mK (0.01° C.)] required in industrial applications. Indeed, as described in the publication of Strouse, entitled "Sapphire whispering Gallery Thermometer," Int J Thermophysics (2007) 28:1812-1821, recent studies have shown that a shift of 1 mK in the magnitude of a platinum resistance thermometer is 20 times greater than the calibration uncertainty and can cause an error in the temperature of the measurement by as much as 30 mK at high temperatures.

Furthermore, an AC resistance bridge is typically required as a readout device for standard platinum resistance thermometers. However, AC resistant bridges typically cost between $50,000 and $75,000.

Accordingly, there is a need for an improved, cost effective industrial thermometer having improved stability, resistance to mechanical shock, and greater certainty in temperature measurements.

SUMMARY OF THE INVENTION

The present invention provides a thermometer. A housing has at least one opening. A dielectric element is disposed in the housing. At least one microwave guide is coupled to the at least one opening for providing a signal to the dielectric element for propagation at a resonant frequency and for receiving the signal from the dielectric element. A temperature determination unit receives the signal from the at least one microwave guide, measures the resonant frequency of the dielectric element, and determines the temperature of the dielectric element based on a predetermined relationship between resonant frequency and temperature of the dielectric element.

The present invention also provides a thermometer having a housing, the housing having at least one opening therein and a dielectric disc disposed in the housing. An input microwave guide is coupled to the at least one opening. The input microwave guide provides a signal to the dielectric disc for propagation at a resonant frequency around a circumference of the dielectric disc. The resonant frequency depends on a temperature of the dielectric disc. An output microwave guide is coupled to the at least one opening. The output microwave guide receives the signal from the dielectric disc. A temperature determination unit receives the signal from the output microwave guide, measures a center frequency of the signal to determine the resonant frequency of the dielectric disc, and determines the temperature of the dielectric disc based on a predetermined relationship between resonant frequency and temperature of the dielectric disc. The relationship between resonant frequency and temperature may be determined by calibrating the dielectric thermometer against a suitable thermometer (e.g. platinum resistance thermometer), in a laboratory skilled in the use of such thermometers for the purpose of calibration of other thermometer types (e.g. dielectric thermometer).

The present invention provides a method of sensing temperature using a dielectric resonator. The method includes generating a sweep signal around a frequency (f). The sweep signal includes a plurality of frequency values within a predetermined range. The input amplitude and/or phase and phase changes occur at the frequency values. The output amplitude and/or phase of the sweep signal at each frequency value is measured at each of the frequency values, and the ratio between the output and input amplitudes or the difference between the output and input phases at each of the frequency values is calculated. A center frequency of the sweep signal is obtained from the dielectric resonator based on the calculated amplitude ratio by selecting the frequency value with the largest calculated ratio, or based on the calculated phase difference by selecting the frequency with the largest rate of change of phase with frequency. The temperature of the dielectric resonator is determined based on the determined center frequency in accordance with a predetermined relationship between the temperature of the dielectric resonator and a resonant frequency of the dielectric resonator.

DETAILED DESCRIPTION OF THE INVENTION

Figure 1:
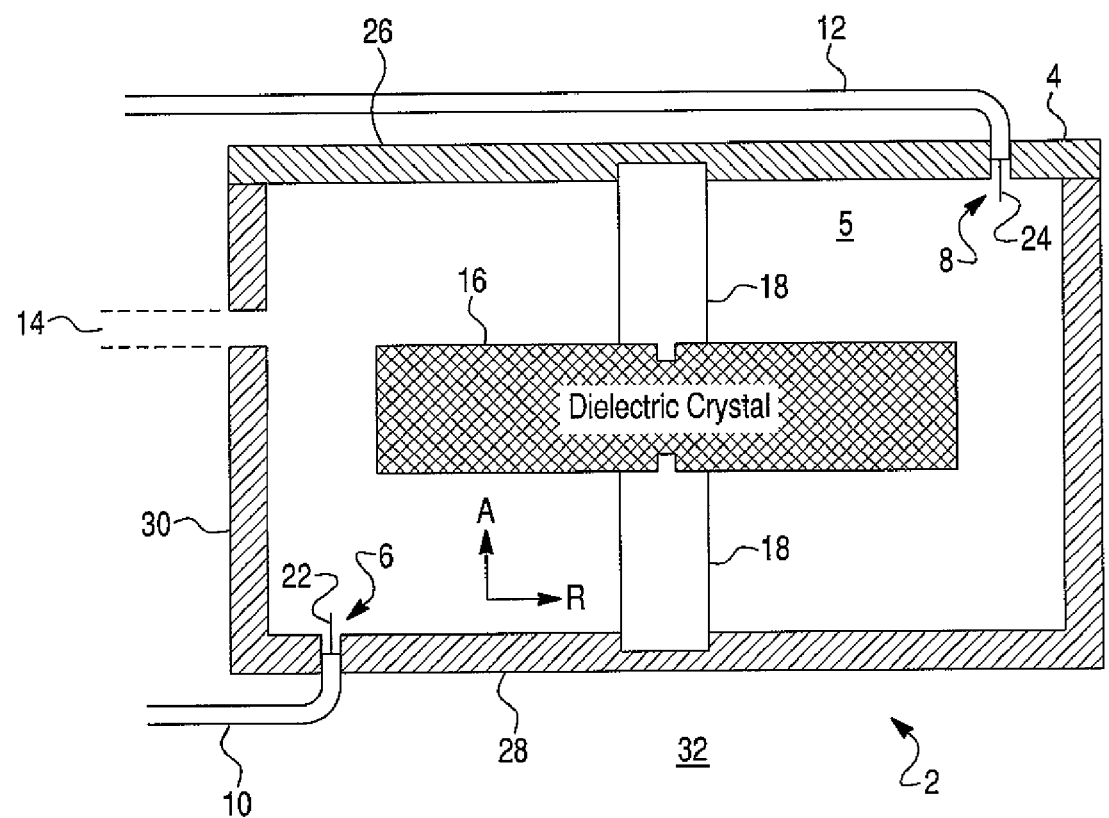
FIG. 1 is a cross-sectional view of a dielectric resonator according to an embodiment of the invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

Whispering gallery mode resonators (WGMR) are used as ultra-stable dielectric resonators ($\Delta f/f < 10^{-12}$ at −196° C.). Dielectric resonators are used to provide a frequency reference in an oscillator circuit. A WG sapphire resonator includes a ring or disk of sapphire inside a metallic cylindrical casing for electromagnetic shielding of and confining resonating RF fields to, the sapphire element. These resonators effectively eliminate RF conduction losses and thus make oscillators that are only limited by performance of the sapphire itself. The sapphire is oriented with its crystal c-axis along the axis of the cylindrical casing in order to achieve cylindrical symmetry for the excited electromagnetic resonance modes. WG electromagnetic modes can be divided into families depending on their field configuration, and further characterized by the number (n) of full waves around the perimeter of the sapphire ring or disk. The modes are doubly degenerate, with azimuthal phase of the two submodes differing by 90 degrees. Modes typically used are the $WGH_{n11}$ family for ring resonators and the $WGE_{n11}$ family for flat disk resonators, where $n \geq 5$. WG denotes whispering gallery, $H_{n11}$ denotes electric field loops formed in the annular body of a wheel or ring, and $E_{n11}$ denotes electric field loops formed in the planar body of a sapphire disk. It will be understood that these modes are exemplary and are not intended to limit the scope of the invention.

With very high microwave quality factors (Q's) at cryogenic temperatures, sapphire resonators provide excellent phase noise performance. In principle, the high-Q factors also provide high frequency stability, but only if the resonator itself is stable. When dielectric resonators are used as oscillators, temperature fluctuations in the sapphire can cause unwanted frequency fluctuations. Thus, much research surrounding whispering gallery mode dielectric resonators has been aimed at ways of canceling or compensating these unwanted frequency variations so that a resonator with high temperature and frequency stability can be achieved.

Figure 2A:
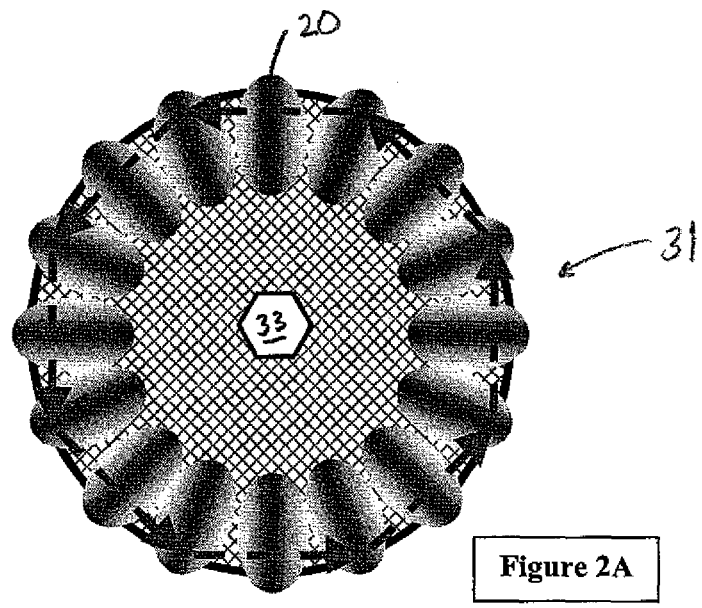
FIG. 2A is top plan view showing an electromagnetic wave propagating in a dielectric resonator according to another embodiment of the invention.
Figure 2B:
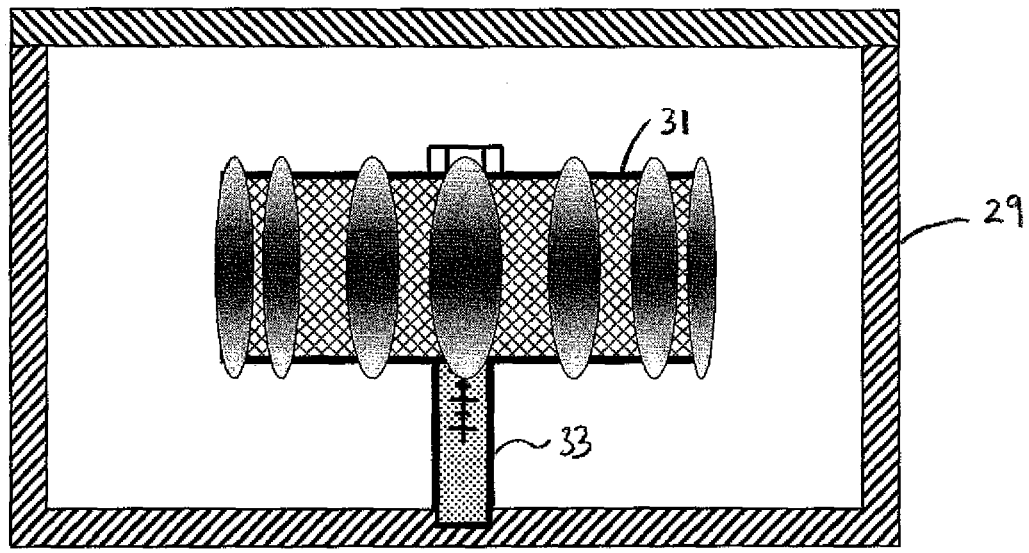
FIG. 2B is an elevational view showing the electromagnetic wave propagating in the dielectric resonator of FIG. 2A.

The intrinsic temperature dependence of the refractive index (or permittivity, its near equivalent) of synthetic sapphire coupled with the ease of measuring the frequencies of high-Q (>20,000) resonant modes, allows the use of a sapphire WGMR as a thermometer rather than a frequency standard, as discussed above. The sapphire whispering gallery thermometer (SWGT) comprises a synthetic sapphire monocrystalline disk configured as a uniaxial anisotropic dielectric resonator. The frequency-temperature relationship is primarily due to the temperature dependence of the refractive index, which contributes approximately 90% to the sensitivity to temperature. The thermal expansion of the sapphire contributes approximately 10% to the sensitivity, and the thermal expansion of the enclosure contributes less than 0.3%. The resonance frequency of a c-axis cut sapphire crystal exhibits a temperature sensitivity of $(df/dT)/f$ of $-10 \times 10^{6 \circ} C.^{-1}$ at −196° C. that increases to $-50 \times 10^{6 \circ} C.^{-1}$ at 77° C. A monocrystalline sapphire disk is uniaxially anisotropic, where a crystal with a c-axis aligned in the z-direction exhibits high-order azimuthal modes (whispering gallery modes). If a pure whispering gallery mode existed in only the radial direction, then the frequency-temperature dependence due to changes in permittivity of the sapphire crystal can be expressed as $$\frac{1}{f_0}\frac{\partial f_0}{\partial T} = \frac{1}{f}\left(\frac{\partial f_0}{\partial \varepsilon_\perp}\frac{\partial \varepsilon_\perp}{\partial T} + \frac{\partial f_0}{\partial \varepsilon_\parallel}\frac{\partial \varepsilon_\parallel}{\partial T} + \frac{\partial f_0}{\partial L}\frac{\partial L}{\partial T} + \frac{\partial f_0}{\partial a}\frac{\partial a}{\partial T}\right) \quad \text{[Equation 1]}$$

where $f_0$ is the center resonance frequency, $\varepsilon_\perp$ is the permittivity in the radial direction, $\varepsilon_\parallel$ is the permittivity in the axial direction, L is the axial length of the sapphire disk, and $\alpha$ is the sapphire disk diameter with the assumption that the relative magnetic permeability is exactly one. As best shown in FIGS. 2A and 2B, whispering gallery resonances occur in a dielectric disk when standing waves are excited along the circumference of the disk with minimal reflection losses. An electromagnetic wave 20 is shown propagating around the circumference in FIGS. 2A and 2B. For the quasi-transverse magnetic modes of the SWGT, Equation 1 (above) may be reduced to estimate the frequency-temperature dependence relationship:

$$\frac{1}{f_0}\frac{\partial f}{\partial T} \approx -\frac{1}{2}\frac{1}{\varepsilon_\parallel}\frac{\partial \varepsilon_\parallel}{\partial T} - \alpha_\perp \qquad \text{[Equation 2]}$$

where $\alpha_\perp$ is the thermal expansion in the radial direction. Thus, while existing oscillator systems have been directed to reducing temperature dependency of the resonant frequency of the disc shaped dielectric resonators through various methods, the embodiments of the present invention attempt to increase thermal conductivity and temperature sensitivity of the resonant frequencies. Although a sapphire disc is described above as the dielectric resonator, it should be understood that other shapes and materials may be used, as described below.

As best shown in FIG. 1, a dielectric resonator 2 includes a housing 4 defining a chamber 5 with input and output ports 6 and 8, respectively. An input waveguide 10 is coupled to the input port 6, and an output waveguide 12 is coupled to the output port 8. A vacuum line(s) 14 denoted by dashed lines is optionally coupled to the housing 4 to create a vacuum type environment inside the housing 4. Alternatively, the housing 4 may be sealed. For example, the housing 4 may be hermetically sealed or sealed using an o-ring to minimize the entry of foreign agents into the chamber 5. The chamber 5 may be filled with an inert gas. Alternatively, the inside of the housing 4 may be coated with a chemically active getter.

A dielectric crystal 16 is supported inside the housing 4 by at least one supporting member 18. The dielectric crystal 16 is supported such that an electromagnetic wave 20 from the input waveguide 10 is coupled into the dielectric crystal 16 to resonate therein, as best shown with reference to FIGS. 2A and 2B. The electromagnetic wave 20 creates a standing wave around the circumference of the crystal 16 approaching total internal reflection. The electromagnetic wave 20 is then coupled to the output waveguide 12.

The dielectric crystal 16 shown in FIG. 1 is disc shaped. Dielectric discs that were tested included radii of 4.4 mm, 5.9 mm, and 8.8 mm. However, it should be understood that the dielectric crystal 16 can be smaller or larger. Of course, when the dielectric crystal 16 is smaller, the frequency of the whispering gallery mode is greater because the circumference around which standing waves are created is smaller.

Stub antennas 22 and 24 extend from the input and output waveguides 10 and 12, respectively. The stub antennas 22 and 24 are recessed into the input and output ports 6 and 8, respectively, so as to extend slightly into the chamber 5. The stub antennas 22 and 24 can extend into the chamber 5 by less than 1 millimeter. We have found that using antennas 22 and 24 that extend only slightly into the chamber 5 minimizes the sensitivity of the resonator 2 to antenna motion. That is, the possibility that the coupling of the electromagnetic wave 20 between the waveguides 10 and 12 and the crystal 16 is affected by movement of the antennas 22 and 24 is minimized. Additionally, due to the short length of the antennas 22 and 24, even if the dielectric resonator 2 is dropped or mishandled, the positions of the antennas 22 and 24 remain substantially constant. The length of the antennas 22 and 24 was selected to optimize the whispering gallery resonances and reduce the spurious cavity resonances. Additionally, the electromagnetic wave 20 is preferably weakly coupled between the antennas 22 and 24 and the crystal 16. Because the electromagnetic wave 20 coupling is weak, the dependence of the resonator 2 on the strength of the signal transferred to and from the crystal 16 on position of the antennas 22 and 24 is negligible.

The input and output waveguides 10 and 12 may be coaxial cables that are sealed so as to prevent gases that have evolved from the dielectric in the waveguides 10 and 12 from entering the chamber 5 via the input and output ports 6 and 8, respectively.

Although the input and output waveguides 10 and 12 are shown as being coupled to top and bottom walls 26 and 28, respectively, of the housing 4, it will be understood by one of ordinary skill in the art that the location of these waveguides 10 and 12 around the housing 4 is a function of whether the modes being transferred to the crystal 16 are transverse magnetic (TM) or transverse electric (TE). In alternative embodiments, the waveguides 10 and 12 can be coupled to the sidewall(s) 30 of the housing 4.

Unlike prior dielectric resonators, the dielectric resonator 2 according to embodiments of the present invention maximizes heat transfer and thermal conductivity between the external environment 32 and the crystal 16. Because the temperature of the crystal 16 affects the resonant frequency of the electromagnetic wave 20, this maximization of heat transfer and thermal conductivity increases the speed of response of the temperature response of the resonant frequency according to the temperature of the external environment 32. In this manner, the dielectric resonator 2 can be used as a thermometer, where the resonant frequency is sensitive to temperature of the external environment 32.

To this end, the housing 4 is preferably a metal enclosure, and the support member 18 is also a thermally conductive material, such as ceramic, brass, steel, or other metals. The housing 4 may be a heavy-walled steel container that is plated with gold. Steel is corrosion resistant and resistant to gas generation at high temperatures, and therefore is stable over a large range of temperatures. The housing 4 may alternatively be formed of copper. The thick walls of the housing 4 are resistant to deformation from handling and from changes in atmospheric pressure. In an exemplary embodiment, the walls of the housing 4 may be approximately ⅛ to ⅓ of an inch in thickness.

The support members 18 maintain the crystal 16 motionless without regard to orientation of the housing 4. Additionally, because the support members 18 have different thermal expansion characteristics from the crystal 16, the support members 18 are dimensioned and positioned to accommodate thermal expansion of the dielectric crystal 16, e.g., sapphire ($\alpha Al$—$O_3$) or quartz, without undue stress on the crystal 16.

The support members 18 may be pedestal supports having a shoulder portion to engage recesses formed on the outer surfaces of the crystal 16. As can be seen in FIG. 1, the dielectric crystal 16 has recesses formed in the top and bottom surfaces. The top and bottom inner surfaces of the housing 30 also include recesses. The recesses of the housing 30 have a different width than the recesses of the crystal 16. Accordingly, the pedestal supports 18 include two different size width portions, one for engaging the recess on the housing 30 and another for engaging the recess on the crystal 16. In this manner, the pedestal supports 18 maintain the crystal 16 in position in the housing 30.

The housing 4 may be disc shaped. The support members 18 support the crystal 16 in the center of the chamber 5 so that there is radial symmetry about a radial direction (R) and axial symmetry about an axial direction (A). Because of these symmetries, frequencies change quadratically with relative motion of the crystal 16 and the chamber 5 in both the radial and axial directions. As a result, even if the crystal 16 does shift slightly, the effect on resonant frequency is small. We have found that without these symmetries, the resonant frequencies will shift linearly with relative motion between the crystal 16 and the housing 4. Accordingly, the symmetries contribute to the mechanical shock resistance of the resonator 2.

The atmosphere in the chamber 5 may be controlled so as to provide additional thermal conductivity to the dielectric resonator 2. A thermally conductive inert gas can be disposed in the chamber 5. For example, if the thermometer is used at high temperatures, e.g., above 189° C., Argon may be used to provide thermal conductivity in the chamber 5. Alternatively, if the thermometer is used at cryogenic temperatures, e.g., below about −150° C., helium can be used to increase thermal conductivity in the chamber 5. Alternatively, air can be used in the chamber 5.

Additionally, the support member 18 is preferably a thermally conductive material, for example metal, to allow heat to be efficiently transferred from the external environment 32 through the housing 4 and support member 18 to the crystal 16. The support members 18 maintain the crystal 16 in substantially the same position without regard to temperature. In particular, the support members 18 provide for "repeatability" of the thermometer due to the fact that despite experiencing a wide range of extreme temperatures, the support members 18 consistently maintain the crystal 16 in the same position. That is, even if the support members 18 slightly change position due to thermal expansion when the temperature is changed from ambient temperature to an extreme temperature, the support members 18 return to substantially the same position when the temperature is returned to ambient temperature.

The dielectric crystal 16 is preferably sapphire, because sapphire provides for the larges Q values for whispering gallery resonances. One of the advantages of using sapphire as a dielectric is that it provides long term stability, which provides repeatability for temperature measurements. However, it should be understood that other types of dielectrics may be used. For example, quartz or other dielectrics may alternatively be used.

Whispering gallery modes are selected such that microwave energy is concentrated about the periphery of the crystal 16, thereby providing a low energy density at the sidewall 30 of the housing 4 and at the center of the crystal 16 along the axial direction (A). Preferably, whispering gallery modes of about 13.5 GHz, or greater, are selected. More specifically, the embodiments of the present invention have been studied with reference to whispering gallery modes of 14.4 GHz, 15.2 GHz, 16.0 GHz, 17.1 GHz, and 19.1 GHz, because these modes have high-Q factors. Q factor is a relationship between how much energy is lost and maintained by a system. Q factor is dependent, in part, on the frequency. The high Q modes reduce sensitivity to changes in cable properties and external electronics. The higher the Q factor, the greater the energy in the signal output from the dielectric and the greater the signal-to-noise ratio (SNR) of the output signal. The greater SNR of the output signal allows the resonant frequency to be detected easily and more precisely.

As best shown in FIG. 2B, a dielectric resonator 31 is mounted in a housing 29 by support 33. Although not shown in FIG. 2B, resonator 31 is ring-shaped having a central hole through which the support 33 extends to fix the resonator 31 to the housing 29. The support member 33 may be a spindle extending through an axial hole in the dielectric resonator 31. The spindle 33 may be made of a thermally conductive material with minimal thermal expansion, for example, brass, steel, or copper. The spindle 33 may be a screw that is fastened to the housing 29 to hold the resonator in position with respect to the housing 29.

Figure 3A:
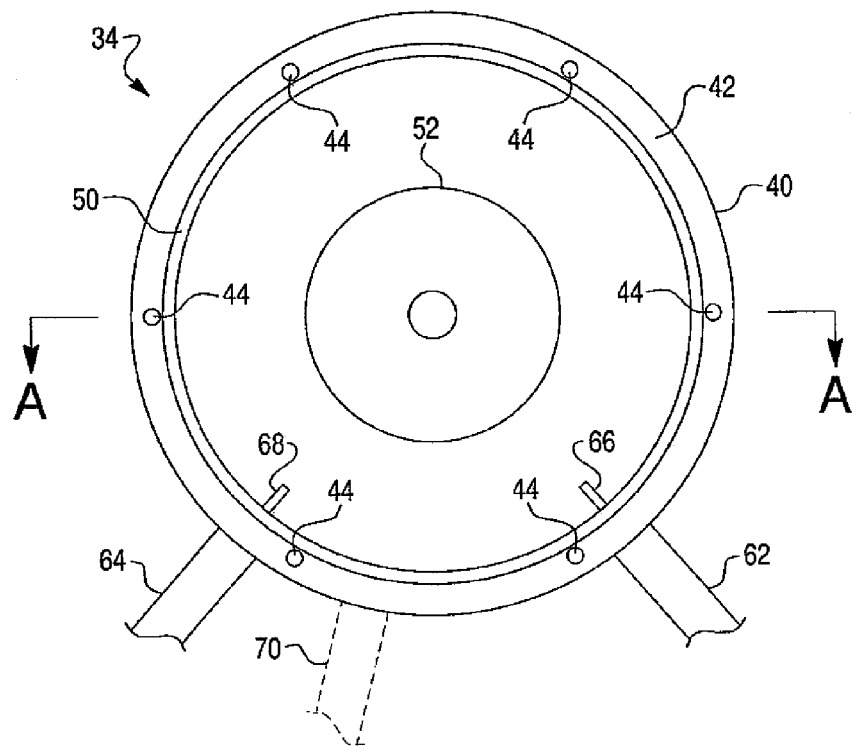
FIG. 3A is a top plan view of a dielectric resonator with a cover plate removed according to another embodiment of the present invention.
Figure 3B:
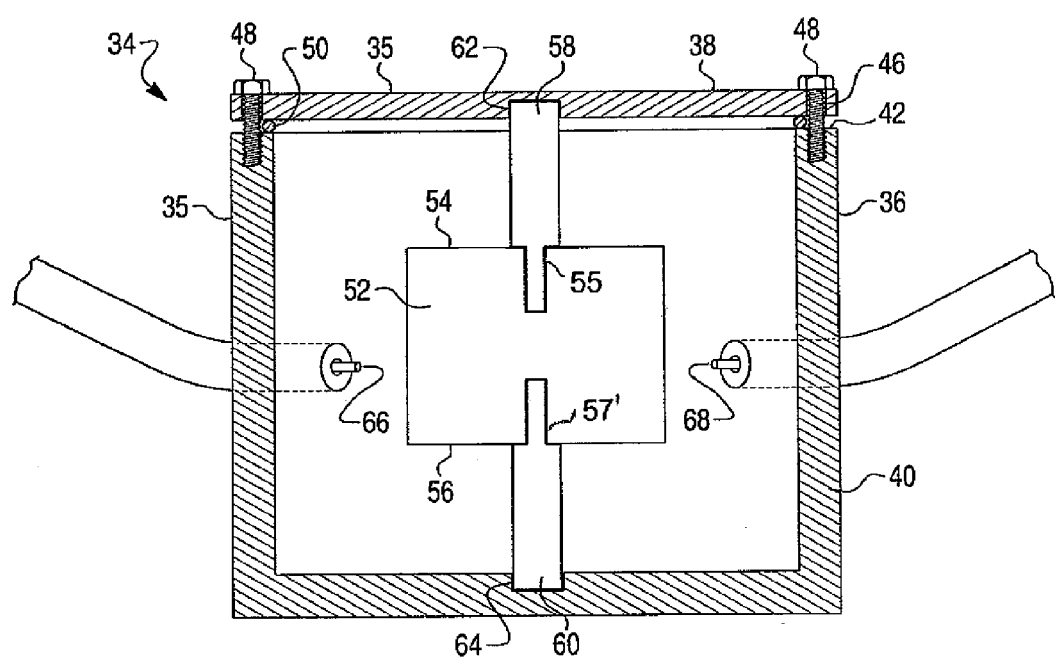
FIG. 3B is a cross-sectional view of the dielectric resonator of FIG. 3A taken along line A-A'.
Figure 4:
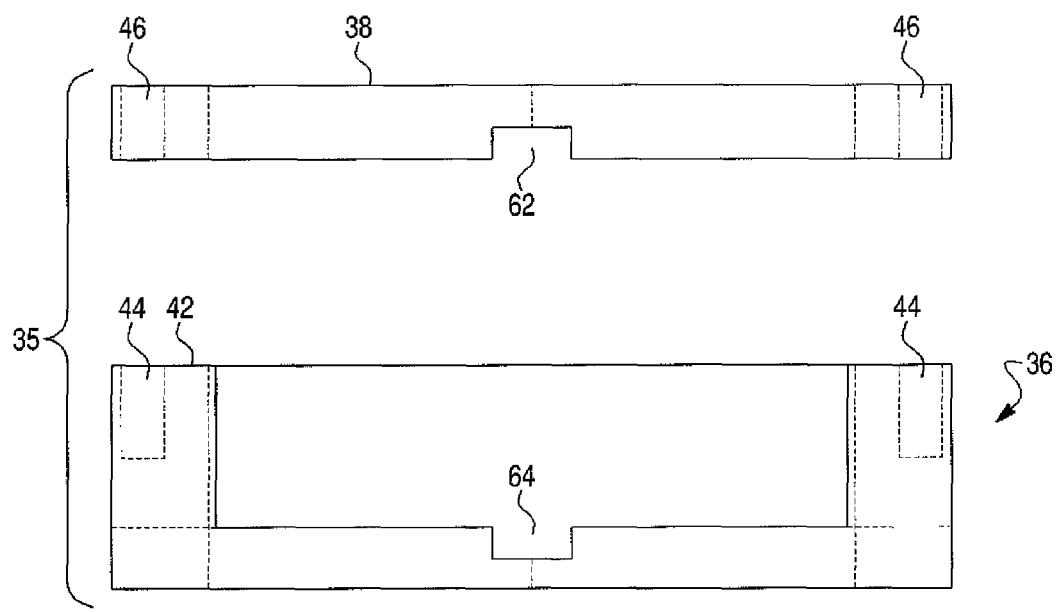
FIG. 4 is an exploded assembly drawing of a housing forming a cavity for the dielectric resonator.

As best shown in FIGS. 3A, 3B and 4, a dielectric resonator 34 has a housing 35 including a bottom casing portion 36 and a top plate portion 38 coupled to the casing portion 36. FIG. 3A is a view into the bottom casing portion 36 with the top plate portion 38 removed. As can be seen, a sidewall 40 has a top edge 42 with a plurality of fastening holes 44. The top plate portion 38 also has a plurality of fastening holes 46 to be aligned with the fastening holes 44 of the bottom casing portion 36 via screws 48. A pliable o-ring 50 sits between the bottom casing portion 34 and the top plate portion 38. The o-ring 50 is clamped between the bottom casing portion 34 and the top plate portion 38 when the screws 48 are applied. When pressure is applied to the o-ring 50, the o-ring 50 compresses and seals the boundary between the casing portion 36 and the plate portion 38. The o-ring 50 may be flattened when the top plate portion 38 is coupled to the casing portion 36. The o-ring 50 is preferably a gold ring. Gold provides some pliability and can withstand high temperature ranges. Other materials may alternatively be used for the o-ring 50. For example, if the resonator 34 is not used over a large temperature range, rubber or silicone may alternatively be used for the o-ring 50. Alternatively, the housing may be hermetically sealed by welding the top plate portion to the bottom casing portion.

In the present embodiment shown in FIGS. 3A, 3B, and 4, a dielectric crystal 52 is formed with two opposing axial surfaces 54 and 56 and recesses 55 and 57 respectively formed therein. Pedestal supports 58 and 60 have shoulder portions that engage the recesses 55 and 57, respectively, on the crystal 52. The plate portion 38 includes recess 62 that engages the pedestal support 58 on the top surface 54 of the crystal 52. Similarly, the casing portion 34 includes recess 64 that engages the pedestal support 60 on the bottom surface of the crystal 52. In this embodiment, because the crystal 52 engages the housing 35 directly via the pedestal supports 58 and 60, heat is transferred directly to the crystal 52 via the thermally conductive housing 35. Because opposite ends of the pedestal supports 58 and 60 are dimensioned to correspond to the different size recesses in the housing 35 and the crystal 52, and the shoulder portions stably support the surfaces 54 and 56 of the crystal 52, the thermal expansion or shifting of the crystal 16 poses less of a risk to consistent performance of the dielectric resonator 34. This arrangement allows for greater repeatability of temperature measurements.

The dielectric resonator 34 also includes input and output waveguides 62 and 64 with antennas 66 and 68 respectively coupled thereto. At least one vacuum line 70 is shown in dashed lines to indicate that this element is optional.

Figure 5A:
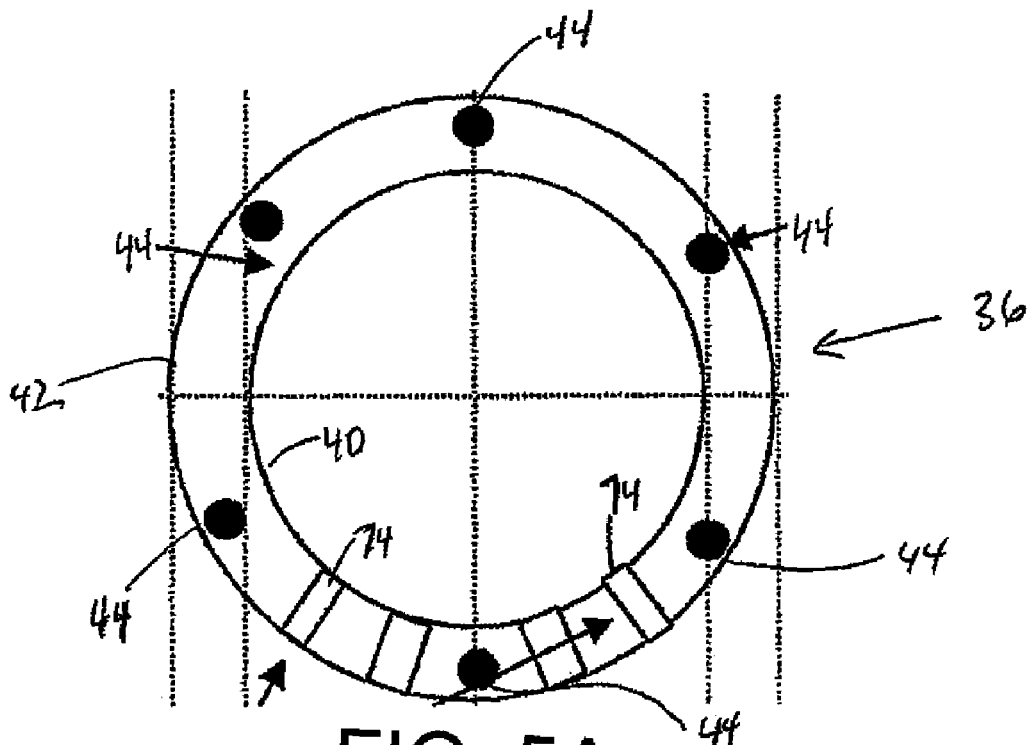
FIGS. 5A and 5B are top plan views of a cavity wall of the housing according to two different embodiments of the invention.
Figure 5B:
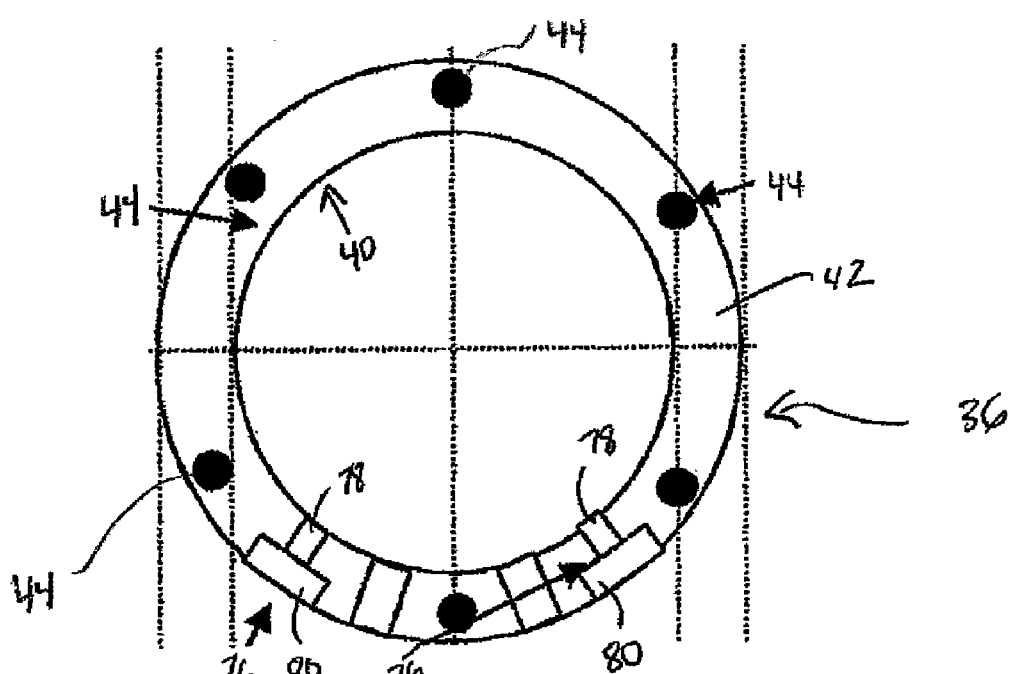

FIGS. 5A and 5B show the top edge 42 of the bottom casing portion 36 according to two different embodiments. As best shown in FIG. 5A, ports 74 to which the waveguides 62 and 64 are connected are simply elongated holes extending through the sidewall 40 of the casing portion 36. As best shown in FIG. 5B, ports 76 include a narrow portion 78 close to an inner surface of the sidewall 40 and a wide portion 80 extending from the narrow portion 78 to an outer surface of the sidewall 40. Ends of the waveguides 62 and 64 are fit snugly into the wide portions 80 to make the attachment of these components easier.

The bottom casing portion 36 shown in FIGS. 5A and 5B also include the fastening holes 44 extending therein. The fastening holes 44 may include threading to engage and retain the screw 48.

Figure 6:
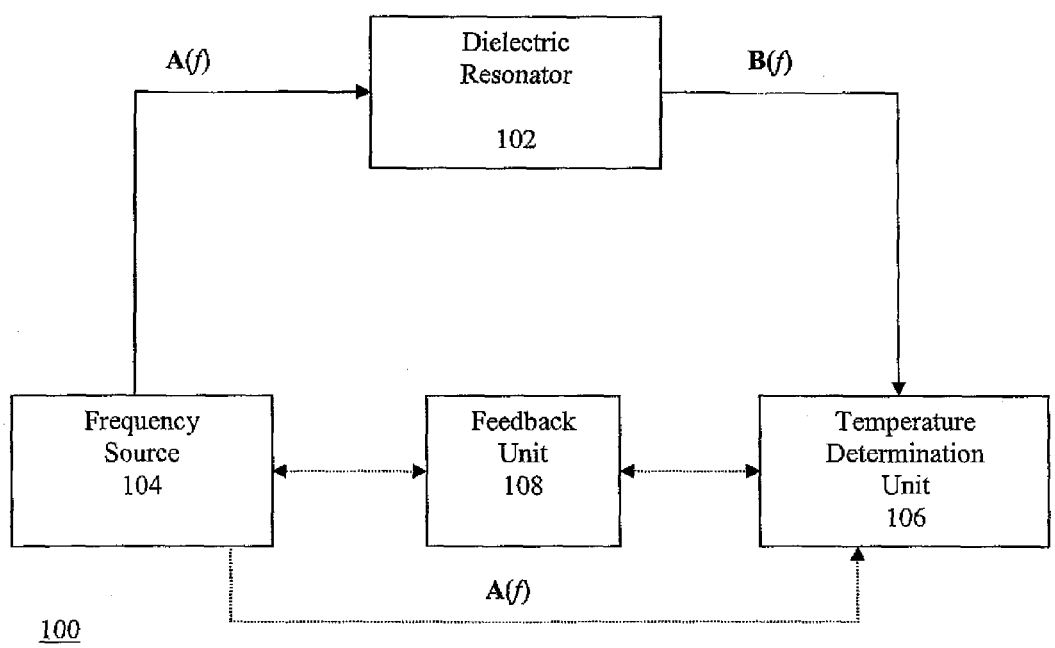
FIG. 6 is a system diagram of a thermometry system according to an embodiment of the present invention.

As best shown in FIG. 6, a thermometry system 100 includes a dielectric resonator 102, a frequency source 104, and a temperature determination unit 106. The frequency source 104 provides a signal A(f) of a predetermined resonant frequency f (or range of frequencies) to the dielectric resonator 102. The dielectric resonator 102 may be similar to the resonators 2, 31, and 34 shown in FIGS. 1 to 3B. The predetermined resonant frequency f (or range of frequencies) corresponds to a known resonant frequency of the dielectric resonator 102 at a known temperature.

In one embodiment, the signal A(f) may be concentrated at the predetermined resonant frequency such that the temperature of the dielectric resonator 102 affects the resonance of the signal. The output resonant frequency can be detected in order to determine the temperature of the dielectric resonator 102. In this case, the output signal B(f) has a center frequency that may be slightly different from the predetermined resonant frequency f. The temperature determination unit 106 measures the center frequency with reference to a known frequency, e.g., from an oscillator.

In another embodiment, a carrier signal, e.g., a sine wave, can be modulated with a range of frequencies centered around f, e.g., by sweeping the frequencies around f, so that the signal contains a plurality of frequency values. The effect of the dielectric resonator 102 on each of the frequencies can be used to determine the temperature of the dielectric resonator 102. For example, the temperature determination unit 106 can use the amplitude change at each of the frequency values in the signal to detect the center frequency. The dielectric resonator 102 receives the signal A(f) of frequency f and amplifies different frequency components differently based on the temperature of the resonator 102. That is, when the A(f) signal of frequency f resonates in the dielectric resonator 102, the frequency value which receives the greatest amount of amplification, i.e., the center frequency, can be used to determine the temperature of the dielectric resonator 102.

The temperature determination unit 106 receives the output signal B(f) and calculates the temperature of the dielectric resonator 102 based on the detected center frequency, as described below. A feedback unit 108 may be included in the thermometry system 100 to provide feedback about the temperature of the resonator 102 and/or the detected center frequency of the output signal B(f) to the frequency source 104. For example, when the signal includes one predetermined resonant frequency f, the feedback unit 108 may synchronize the center frequency of the output signal B(f) with the predetermined resonant frequency f. In this case, the feedback unit 108 may be a phase locked loop (PLL) or other electronics device.

When the center frequency is detected by comparing amplitude changes at different frequencies, the input signal A(f) or amplitude thereof is provided by the frequency source 104 to the temperature determination unit 106. The input signal A(f) or the amplitude values of the input signal A(f) may be provided via the feedback unit 108 as indicated by the double-sided arrows. Alternatively, the input signal A(f) or the input amplitude values may be provided by the frequency source 104 directly to the temperature determination unit 106, as indicated by the single-sided arrow.

Figure 7:
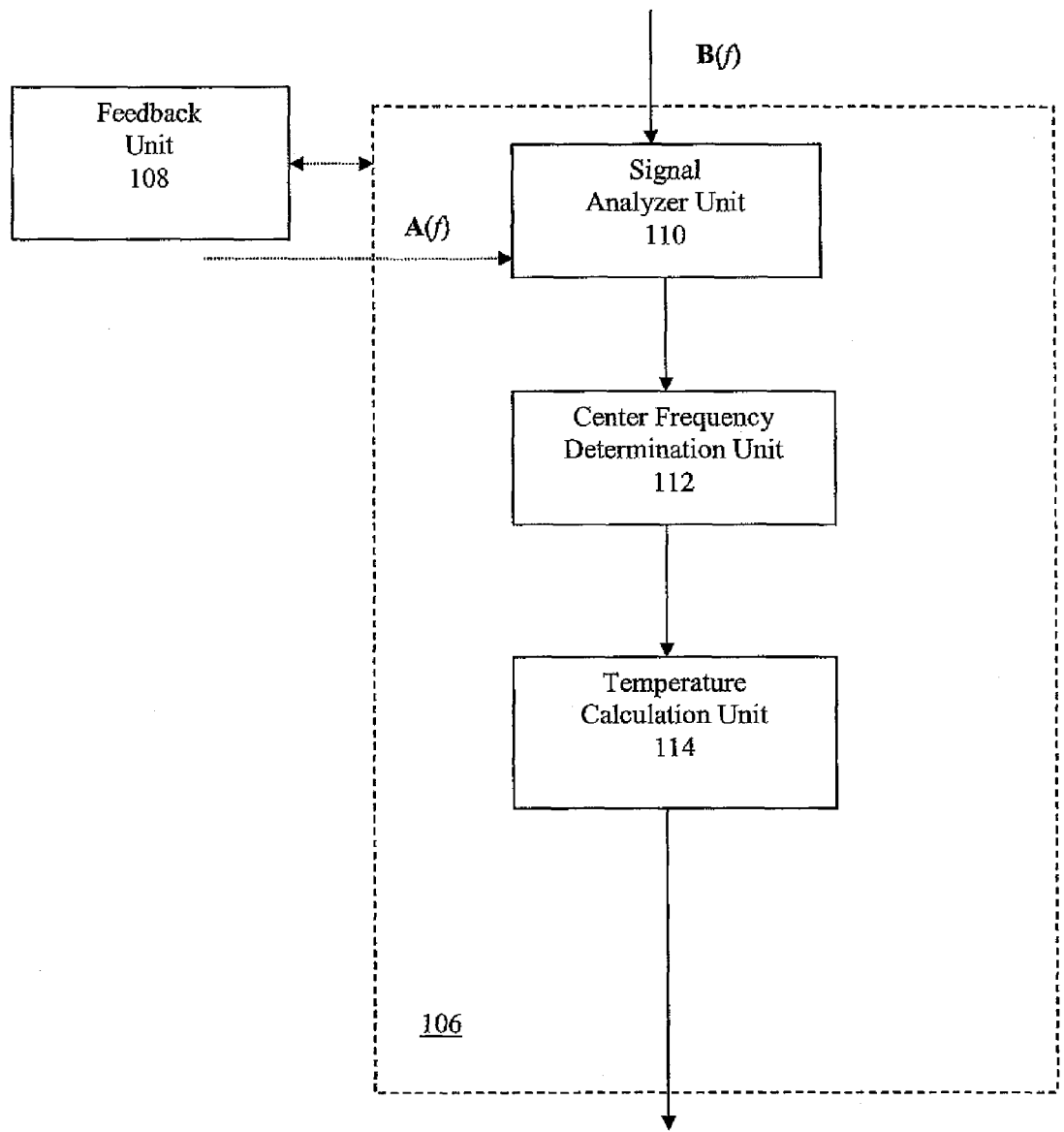
FIG. 7 is a block diagram showing a temperature determination unit of the thermometry system shown in FIG. 6.

As best shown in FIG. 7, the temperature determination unit 106 includes a signal analyzer unit 110 that receives the output signal B(f) from the dielectric resonator 102 shown in FIG. 6. A center frequency determination unit 112 detects a center frequency of the output signal B(f), as mentioned above. The signal analyzer unit 110 may be a frequency counter or a network analyzer.

The input signal A(f) and output signal B(f) are vector quantities with both amplitude and phase characteristics. Equivalently, A(f) and B(f) may be expressed in terms of in-phase and out-of-phase vector components or in terms of complex amplitudes.

In one embodiment, the signal analyzer unit 110 compares the frequency of the output signal B(f) to a known reference frequency, for example, from an oscillator. In this case, the signal analyzer unit 110 may be a frequency counter. The center frequency determination unit 112 determines the center frequency of the output signal B(f) based on a relative comparison of the oscillation frequency and the frequency of the output signal B(f) performed by the frequency counter.

In another embodiment in which the input signal A(f) provided to the resonator 102 contains a range of frequencies, the signal analyzer unit 110 measures the amplitude and/or phase changes at each of the frequencies by comparing the complex amplitude of the output signal B(f) from the resonator 102 to the complex amplitude of the input signal A(f) provided by the feedback unit 108 or the frequency source 104. Accordingly, the center frequency determination unit 112 selects the frequency with the largest amplitude increase or the largest rate of change of phase with frequency as the center frequency.

A temperature calculation unit 114 can then determine the temperature of the dielectric resonator 102 shown in FIG. 6 based on the detected center frequency of the output signal B(f). The center frequency may be a fractional change in frequency, i.e., $(f0-f\Delta)/f0$ that occurs based on the temperature of the resonator 102. The temperature calculation unit 114 can determine the temperature using a temperature versus frequency model. The temperature versus frequency model may be a predetermined relationship between the temperature and the center or resonant frequency. The temperature versus frequency model may include a theoretical reference function that models the dependence of frequency on temperature of the dielectric resonator 102 and a measured deviation function that defines the deviation of the measurements from the reference function. The relationship can be pre-stored or determined at calibration. The reference function can be determined using existing software that fits the temperature versus frequency function to a lower order polynomial, such as a cubic function.

Because the dielectric resonator 102 is stable and impact resistant, the thermometry system 100 need not be calibrated frequently. As a result, the coefficient values of the temperature versus frequency model maintain their accuracy. The stability of the thermometry system 100 results from one or more of the following factors: (1) the stable support of the dielectric crystal inside the housing/chamber, (2) the minimization of the effect of thermal expansion on the positioning of the crystal, (3) the short length of the antennas communicating with the crystal, (4) the weak coupling between the antennas and the crystal, (5) the tight seal or vacuum created in the chamber, and (6) the thermal conductivity of each of the elements in the resonator, among other things. Of course, one of ordinary skill in the art will understand that these factors need not all be present in each of the embodiments of the present invention. The stability of the thermometry system 100 is a substantial improvement over the conventional platinum resistance thermometer, which must be handled delicately in order to avoid adversely affecting the calibration of the device. Because calibrating an industrial thermometer is extremely expensive, the thermometry system 100 is much more cost efficient than the conventional platinum resistance thermometer.

Figure 8:
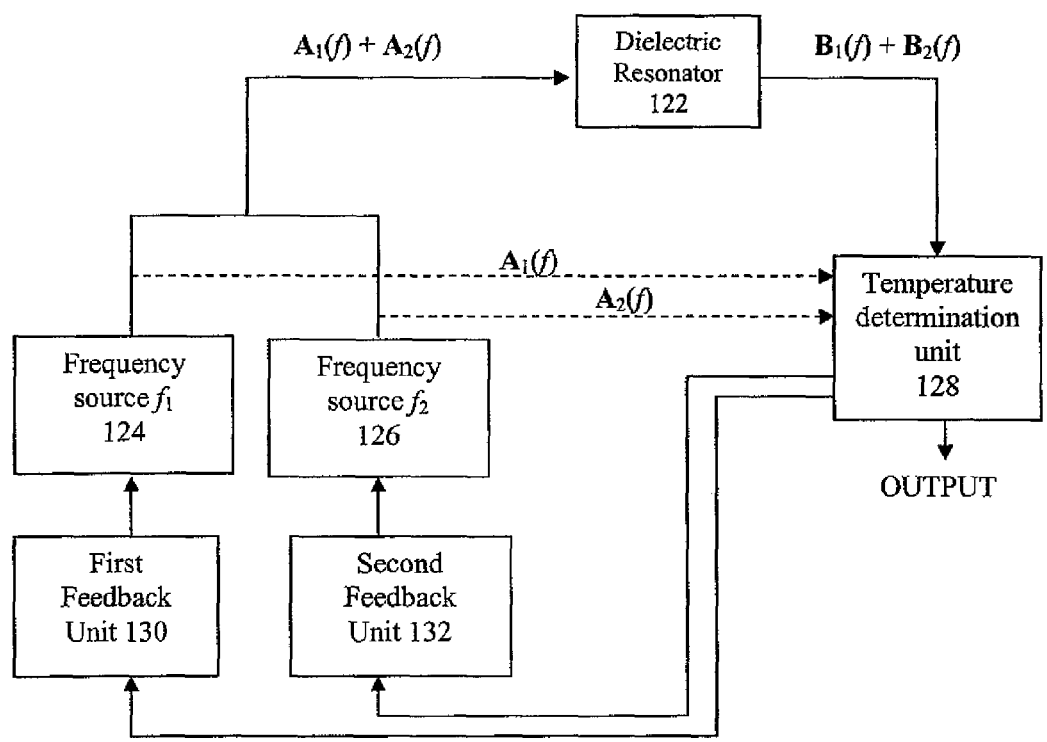
FIG. 8 is a system diagram showing a thermometry system according to another embodiment of the present invention.

As best shown in FIG. 8, a thermometry system 120 includes a dielectric resonator 122, which may be similar to any of the dielectric resonators shown and described above. First and second frequency sources 124 and 126 provide first and second signals $A_1(f)$ and $A_2(f)$ of first and second resonant frequencies f1 and f2 (or first and second range of frequencies), respectively, to the dielectric resonator 122. That is, the first and second signals $A_1(f)$ and $A_2(f)$ can be combined/mixed and coupled to the dielectric resonator 122 via an input waveguide (not shown). The first and second resonant frequencies f1 and f2 (or range of frequencies) correspond to known resonant frequency modes of the dielectric resonator 122 at a known temperature.

In one embodiment, the first and second signals $A_1(f)$ and $A_2(f)$ may be concentrated at predetermined resonant frequencies f1 and f2 such that the temperature of the dielectric resonator 122 affects the resonances of the combined signal. The output resonant frequencies can be detected in order to determine the temperature of the dielectric resonator 122. In this case, the output signal $B_1(f)$ and $B_2(f)$ has first and second center frequencies that may be slightly different from the predetermined resonant frequencies f1 and f2, respectively. The temperature determination unit 128 measures the first and second center frequencies with reference to a known frequency, e.g., from an oscillator. Because each resonant mode has a different frequency sensitivity to temperature, the temperature of the resonator 122 can be determined based on the ratio of the first and second center frequencies of the output signal $B_1(f)$ and $B_2(f)$, which also varies with temperature.

In another embodiment, first and second carrier signals, e.g., a sine waves, can be respectively modulated with a first range of frequencies centered around f1 and a second range of frequencies centered around f2 so that the resulting signals $A_1(f)$ and $A_2(f)$ contain a plurality of frequency values within the two different ranges. The affect of the dielectric resonator 122 on each of the frequencies in the ranges can be used to determine the temperature of the dielectric resonator 122. For example, the temperature determination unit 128 can use the amplitude change at each of the frequency values in the signal $B_1(f)$ and $B_2(f)$ to detect the first and second center frequencies. The dielectric resonator 122 receives the signal $A_1(f)$ and $A_2(f)$ including frequencies f1 and f2 and amplifies different frequency components differently based on the temperature of the resonator 122. That is, when the signal $A_1(f)$ and $A_2(f)$ of frequencies f1 and f2 resonates in the dielectric resonator 122, the frequency values which receive the greatest amount of amplification, i.e., the center frequencies, can be used to determine the temperature of the dielectric resonator 122. Because each resonant mode has a different frequency sensitivity to temperature, the temperature of the resonator 122 can be determined based on the ratio of the first and second center frequencies of the output signal. The temperature determination unit 128 receives the output signal $B_1(f)$ and $B_2(f)$ and calculates the temperature of the dielectric resonator 122 based on a ratio between the first and second center frequencies. First and second feedback units 130 and 132 may be included between the temperature determination unit 128 and the first and second frequency sources 124 and 126, respectively, to provide feedback about the temperature of the resonator 122 and/or the first and second center frequencies detected. For example, when the input signal $A_1(f)$ and $A_2(f)$ is concentrated at two predetermined resonant frequencies f1 and f2, the first and second feedback units 130 and 132 may synchronize the first and second center frequencies of the output signal $B_1(f)$ and $B_2(f)$ with the two predetermined resonant frequencies f1 and f2, respectively. In this case, the first and second feedback units 130 and 132 may be phase locked loops (PLLs) or other electronic devices.

Figure 9:
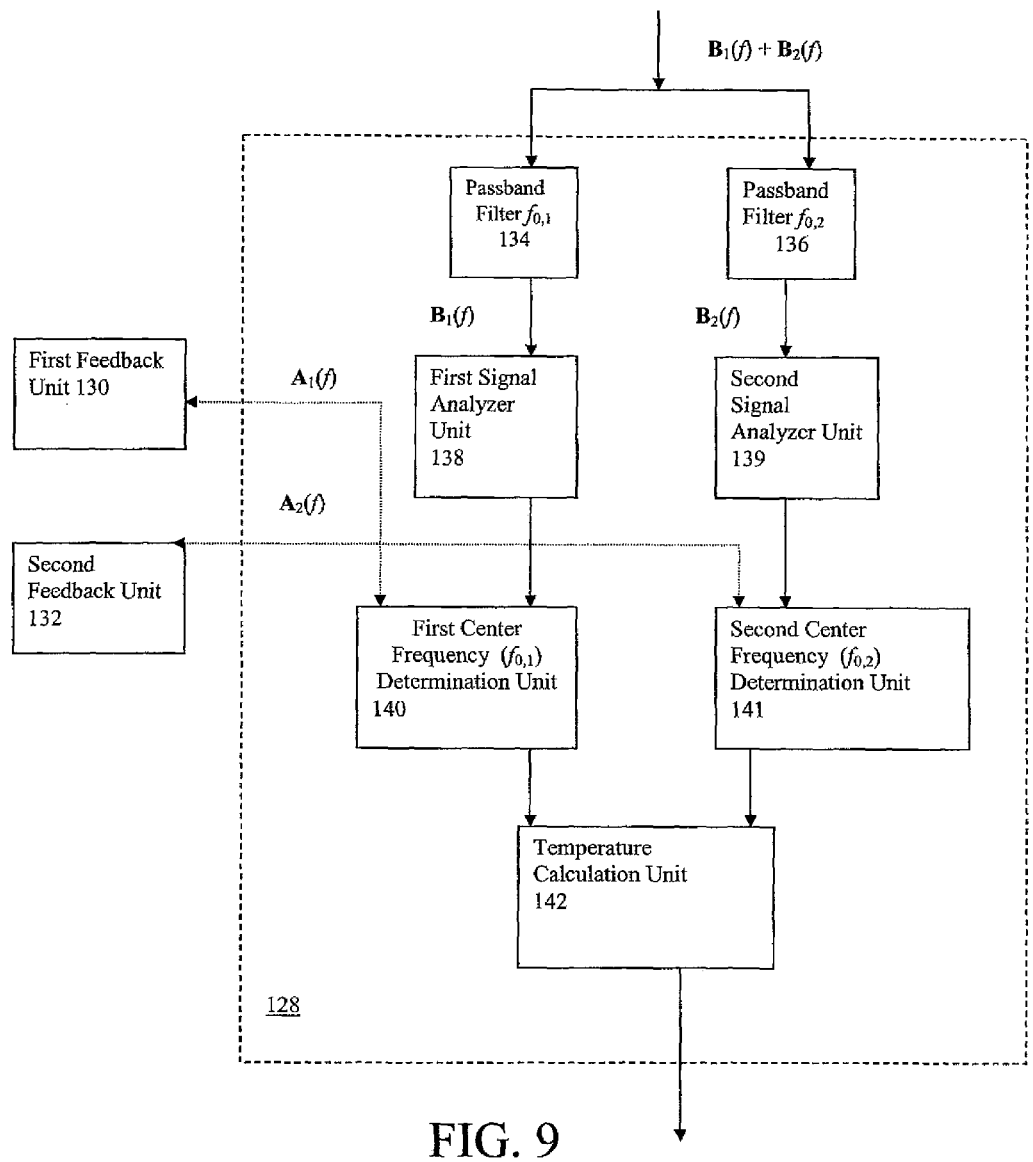
FIG. 9 is a block diagram showing a temperature determination unit of the thermometry system shown in FIG. 8.

The temperature determination unit 128 is shown in more detail in FIG. 9. The temperature determination unit 128 includes first and second passband filters 134 and 136 for filtering the signals $B1(f)$ and $B2(f)$ received from the dielectric resonator 122 around the first and second center frequencies $f_{0,1}$ and $f_{0,2}$, respectively. That is, the passband filters 134 and 136 separate the signal into two frequency components, one centered around frequency $f_{0,1}$, and the other one centered around $f_{0,2}$. First and second signal analyzer units 138 and 139 receive the filtered signals $B_1(f)$ and $B_2(f)$ from the first and second passband filters 134 and 136, respectively. The first and second signal analyzer units 138 and 139 may be frequency counters or network analyzers. First and second center frequency determination units 140 and 141 determine the center frequencies $f_{0,1}$, and $f_{0,2}$ based on the output of the first and second signal analyzer units 138 and 139, respectively.

In one embodiment, the signal analyzer units 138 and 139 compare the center frequencies $f_{0,1}$ and $f_{0,2}$ of the output signal $B_1(f)$ and $B_2(f)$ to a known reference frequency, for example, from an oscillator. In this case, the signal analyzer units 138 and 139 may be frequency counters that receive a known frequency from an oscillator. The first and second center frequency determination units 140 and 141 determine the first and second center frequencies $f_{0,1}$ and $f_{0,2}$ of the output signal $B_1(f)$ and $B_2(f)$ based on a relative comparison between the oscillation frequency and the frequencies of the output signal $B_1(f)$ and $B_2(f)$. In another embodiment, there may be a single signal analyzer unit 138, which receives both filtered signal $B_1(t)$ and $B_2(f)$ and compares one of the first and second center frequencies $f_{0,1}$ and $f_{0,2}$ to the other in order to obtain a relative frequency value. In this case, no additional oscillator is necessary and the ratio of the first and second center frequencies $f_{0,1}$ and $f_{0,2}$ can be used to calculate temperature. It should be noted that the center frequency determination units 140 and 141 can be omitted from this embodiment. Accordingly, the temperature calculation unit 142 calculates the temperature based on the ratio of the first and second center frequencies $f_{0,1}$ and $f_{0,2}$.

In another embodiment in which the signal $A_1(f)$ and $A_2(f)$ provided to the resonator 122 contains a range of frequencies, the first signal analyzer unit 138 determines the amplitude at each of the frequencies of the filtered output signal $B_1(f)$ so that the first center frequency determination unit 140 compares the amplitude and/or phase of the output signal $B_1(f)$ around the first center frequency $f_{0,1}$ to the amplitude and/or phase from the input signal $A_1(f)$ around the first center frequency $f_{0,1}$ to select the value of the first center frequency $f_{0,1}$. Similarly, the second signal analyzer unit 139 determines the amplitude and/or phase at each of the frequencies of the filtered output signal $B_2(f)$ so that the second center frequency determination unit 141 compares the amplitude and/or phase of the output signal $B_2(f)$ around the second center frequency $f_{0,2}$ to the amplitude and/or phase from the input signal $A_2(f)$ around the first center frequency $f_{0,2}$ to select the value of the second center frequency $f_{0,2}$. The input signal and/or the complex amplitudes $A1(f)$ and $A2(f)$ of the input signal are provided to the first and second center determination units 140 and 141 by the first and second feedback units 130 and 132 or directly from the first and second frequency sources 124 and 126 shown in FIG. 8. Accordingly, the center frequency determination units 140 and 141 select the frequencies with the largest amplitude increase or with the largest rate of change of phase with frequency as the first and second center frequencies $f_{0,1}$ and $f_{0,2}$. The temperature calculation unit 142 calculates the temperature of the resonator 122 based on the measured ratio of the first and second center frequencies $f_{o,1}$ and $f_{o,2}$. The temperature of the dielectric resonator 122 is determined by a temperature versus frequency ratio model $T(f_{o,1}/f_{o,2})$ which calculates the temperature based on a model reference function and an associated measured deviation function. The reference function and measured deviation can be determined at calibration using existing software with fitting functions.

Figure 10:
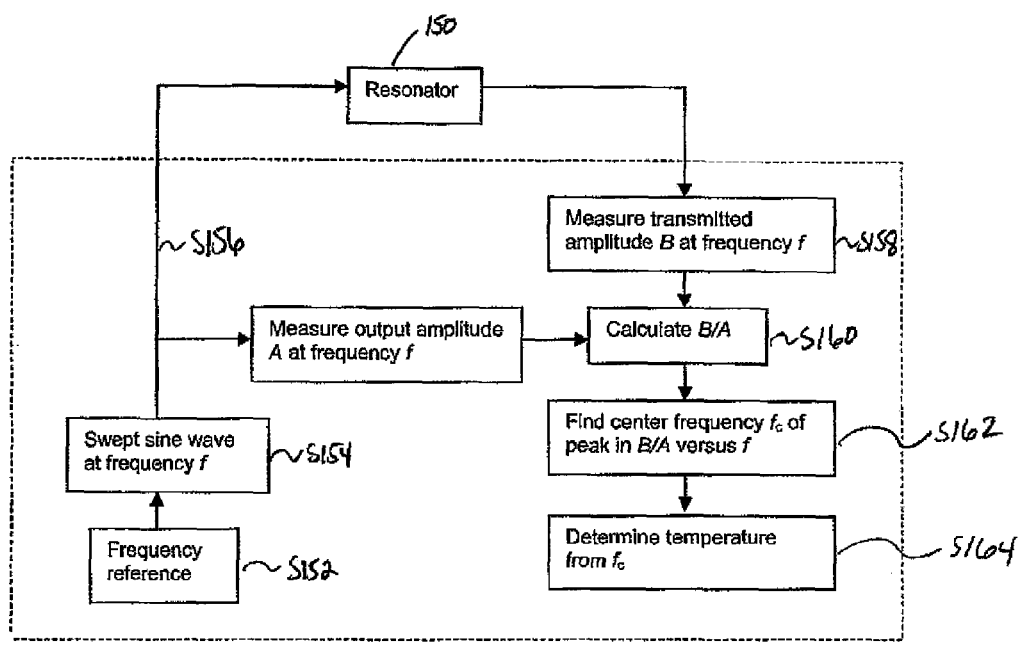
FIG. 10 is a flowchart of a method of sensing temperature according to another embodiment of the present invention.

As best shown in FIG. 10, a method of sensing temperature using dielectric resonator 150 according to an embodiment of the present invention is shown. A frequency reference is provided at step S152. A swept sine wave is provided at frequency (f) at step S154. In step S154, the sine wave is modulated with the range of frequencies (f) around the frequency reference. Complex amplitude (A) of the input signal is measured at different frequencies in the frequency range (f). The input signal is provided to the resonator 150 at step S156. The complex amplitude (B) of the signal transmitted from the dielectric resonator 150, i.e., the output signal, is then measured at different frequencies in the frequency range (f) at step S158. The ratio of the complex output amplitude to the complex input amplitude (B/A) is then calculated at the different frequencies at step S160. At step S162, a center frequency $f_c$ is determined about the peak in a relationship of B/A versus f. That is, the frequency that corresponds to the largest increase in amplitude or rate of change of phase with frequency for B/A is selected as the center frequency $f_c$. At step S164, the temperature of the resonator 150 can then be determined based on the center frequency $f_c$.

Figure 11:
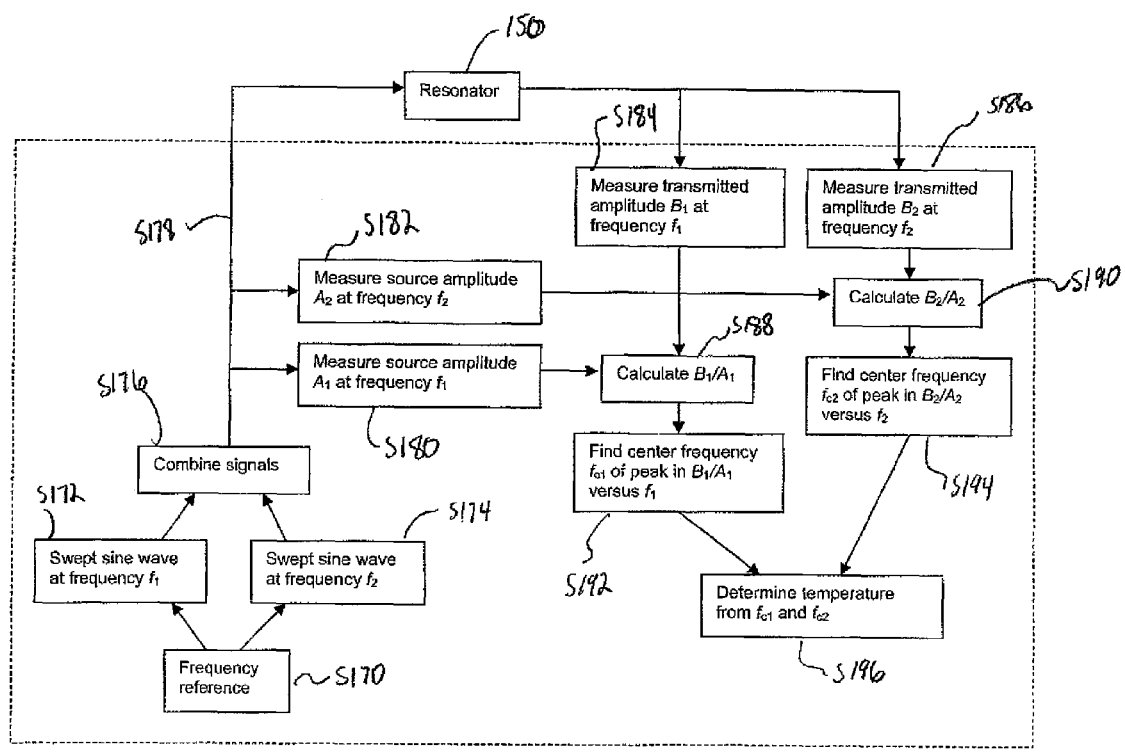
FIG. 11 is a flowchart of a method of sensing temperature according to yet another embodiment of the present invention.

As best shown in FIG. 11, a method of sensing temperature using the resonator 150 according to another embodiment of the present invention is shown. At step S170, a frequency reference is provided. At step S172, a swept sine wave is provided at frequency $f_1$. In step S172, the sine wave is modulated with the range of frequencies ($f_1$). At step S174, a swept sine wave is provided at frequency $f_2$. Frequencies $f_1$ and $f_2$ may have a predetermined relationship to the reference frequency f. In step S172, the sine wave is modulated with the range of frequencies ($f_2$). At step S176, the swept sine waves are combined into a combined input signal. The combined input signal is provided to the resonator 150 at step S178. At step S180, the complex amplitude ($A_1$) of the combined input signal is measured at different frequencies in the frequency range $f_1$. At step S182, the complex amplitude ($A_2$) of the combined input signal is measured at different frequencies in the frequency range $f_2$. At step S184, the complex amplitude ($B_1$) of the combined output signal is measured at different frequencies in the frequency range $f_1$. At step S186, the complex amplitude ($B_2$) of the combined output signal is measured at different frequencies in the frequency range $f_2$. At step S188, the ratio of the complex input and output amplitudes $B_1/A_1$ is then calculated at the different frequencies in the frequency range $f_1$. At step S190, the ratio of the complex input and output amplitudes $B_2/A_2$ is then calculated at the different frequencies in the frequency range $f_2$. At step S192, a center frequency $f_{c1}$ is determined about the peak in a relationship of $B_1/A_1$ versus $f_1$. That is, the frequency that corresponds to the largest increase in amplitude or rate of change of phase with frequency for $B_1/A_1$ is selected as the center frequency $f_{c1}$. At step S194, a center frequency $f_{c2}$ is determined about the peak in a relationship of $B_2/A_2$ versus $f_2$. That is, the frequency that corresponds to the largest increase in amplitude or rate of change of phase with frequency for $B_2/A_2$ is selected as the center frequency $f_{c2}$. At step S196, the temperature of the resonator 150 can then be determined based on the relationship, e.g., the ratio, between $f_{c2}$ and $f_{c1}$. That is, the temperature can be determined from the ratio between $f_{c2}$ and $f_{c1}$ in the manner set forth above with respect to FIG. 9.

Figure 12:
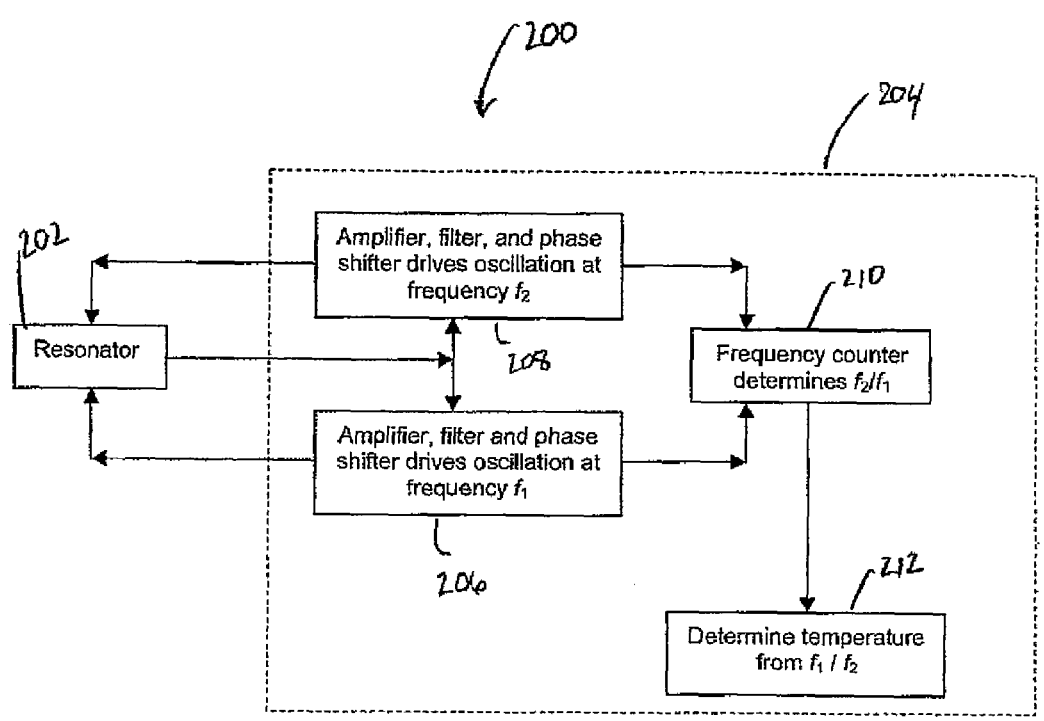
FIG. 12 is a system diagram of a thermometry system according to yet another embodiment of the present invention.

As best shown in FIG. 12, a thermometry system 200 according to an alternative embodiment includes a resonator 202 and a temperature determination unit 204. The temperature determination unit 204 includes a first frequency unit 206, a second frequency unit 208, a frequency counter 210, and a ratio determination unit 212. The first frequency unit 206 provides an input signal of frequency $f_1$ to the resonator 202. The first frequency unit 206 also receives, amplifies, and filters an output signal. Phase locking or other synchronization ensures that the input and output frequencies both correspond to the center frequency $f_{o,1}$. The first frequency unit 206 then provides the amplified and filtered signal to the frequency counter 210. The second frequency unit 208 operates in a similar manner to the first frequency unit 206, with respect to the original frequency $f_2$. The frequency counter 210 determines the ratio between the center frequencies $f_{o,1}$ and $f_{o,2}$, respectively, by counting one frequency with respect to the other. The ratio determination unit 212 then determines the temperature of the resonator 202 based on the ratio $f_{o,1}/f_{o,2}$.

Figure 13:
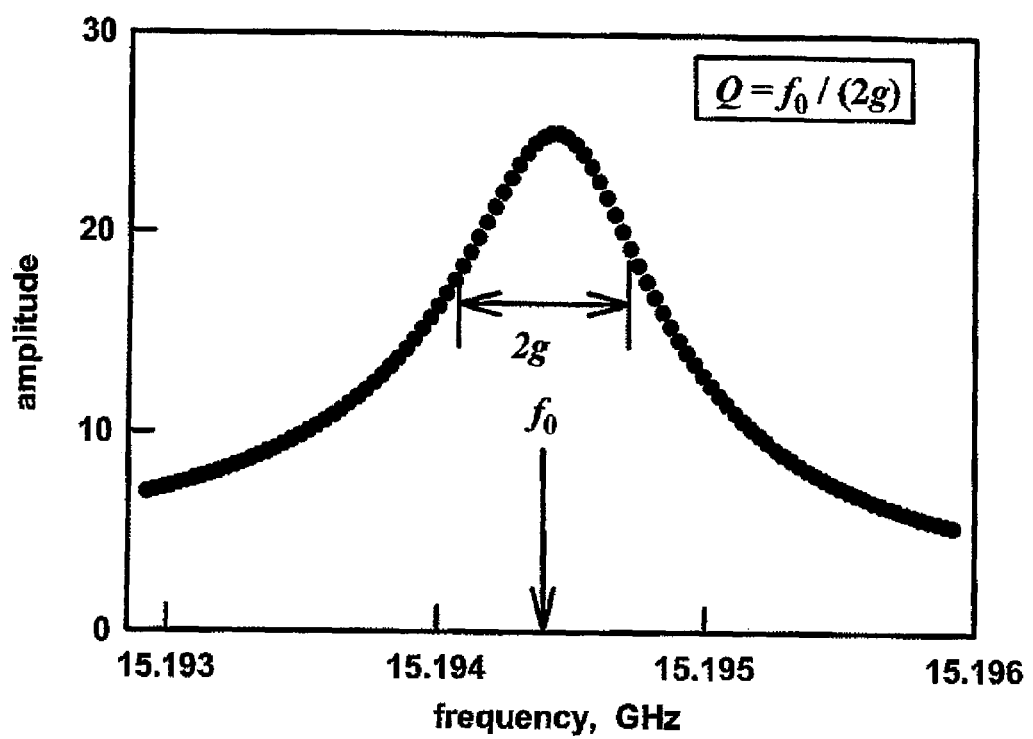
FIG. 13 is a graph illustrating the relationship between frequency and amplitude.
Figure 14:
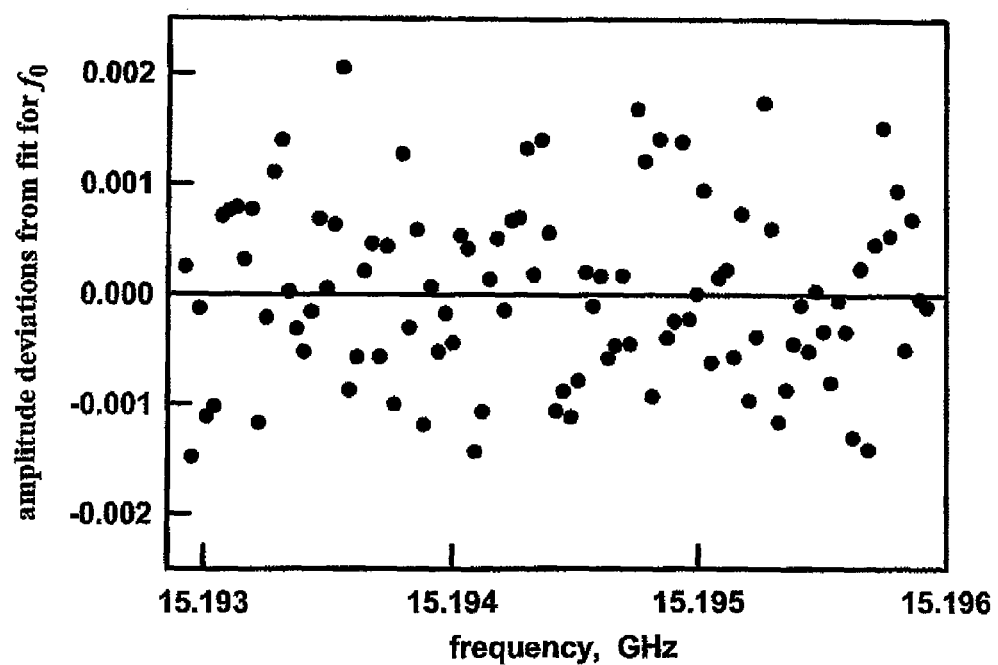
FIG. 14 is a graph showing amplitude deviations from a fit of frequency f0.

As best shown in FIG. 13, Q factor (quality factor) is proportional to center resonant frequency $f_0$, that is, $Q=f_0/(2g)$. "g" represents the half width defined as the width of frequency for which the energy is half the peak of the center resonant frequency $f_0$. Thus, the higher the center resonant frequency $f_0$ is, the higher the Q factor that can be obtained. FIG. 13 shows the Q factor for an exemplary mode centered at about 15.194 GHz. Because Q factor represents the amount of energy maintained in the system with respect to the amount of energy lost by the system, Q factor determines the resolution with which the temperature can be measured by the thermometer. Thus, a high-Q factor is desirable. FIG. 14 is a graph showing amplitude deviations from a fit of frequency $f_0$ for the same mode shown in FIG. 13. The amplitudes shown in FIGS. 13 and 14 are complex amplitudes.

Figure 15A:
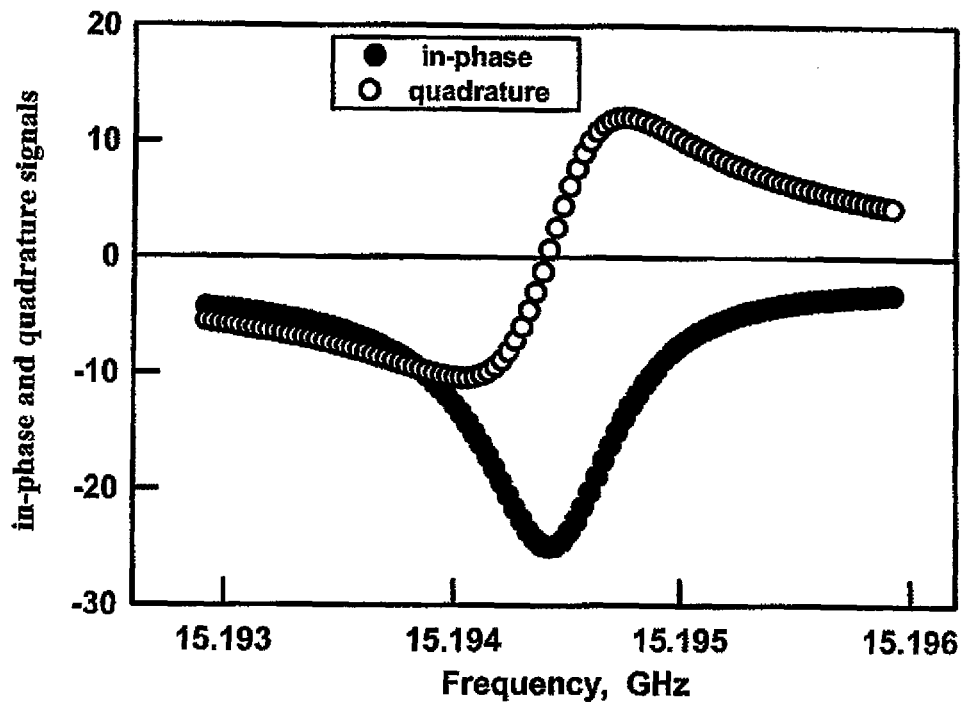
FIGS. 15A and 15B are graphs showing in-phase and quadrature signals and residuals from the fit for frequency $f_0$ shown in FIG. 14.
Figure 15B:
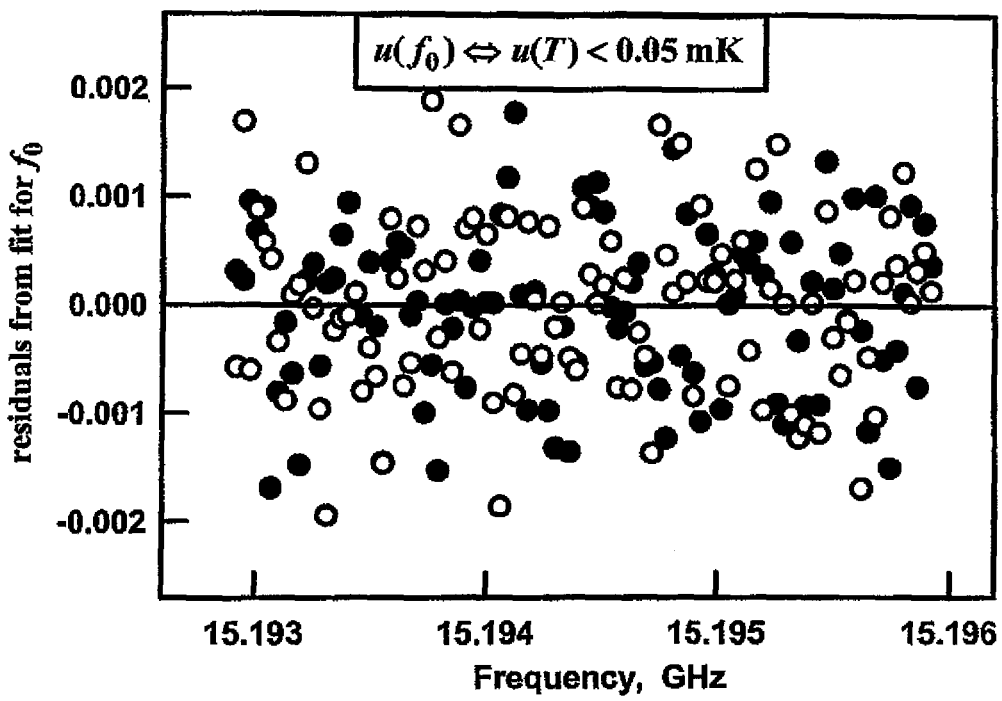

FIGS. 15A and 15B are graphs showing in-phase and quadrature signals and residuals from the fit for frequency f0 shown in FIG. 14. FIGS. 15A and 15B are directed to the exemplary mode centered around 15.194 GHz. As best shown in FIG. 15B, the resolution of $f_0$, i.e., the center frequency, $u(f_0)<0.05$ mK at 0° C. Accordingly, the temperature can be determined accurately from the resonant frequency.

Figure 16:
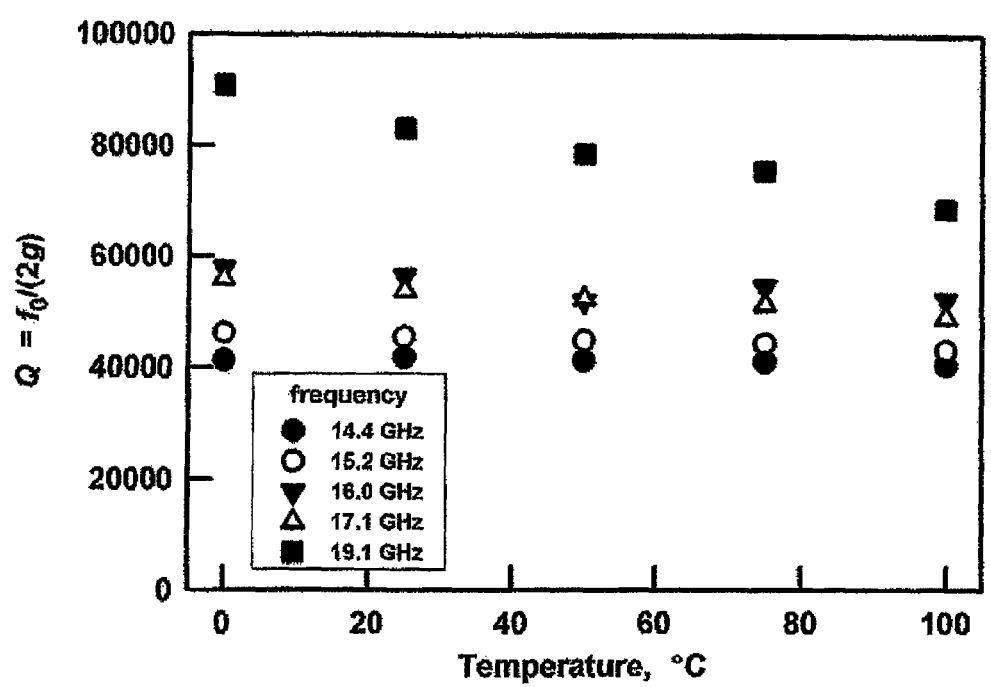
FIG. 16 is a diagram showing the relationship between temperature and Q factor for several exemplary modes.

FIG. 16 is a diagram showing the relationship between temperature and Q factor for several exemplary modes having resonant frequencies of 14.4 GHz, 15.2 GHz, 16.0 GHz, 17.1 GHz, and 19.1 GHz. As can be seen from FIG. 15, the Q factor of the exemplary modes varies as a function of temperature. For example, for the resonant mode centered around 19.1 GHz, the Q factor is about 90,000 at 0° C. and about 70,000 at 100° C. The high Qs makes the resonant frequencies of these modes easy to locate.

Figure 17:
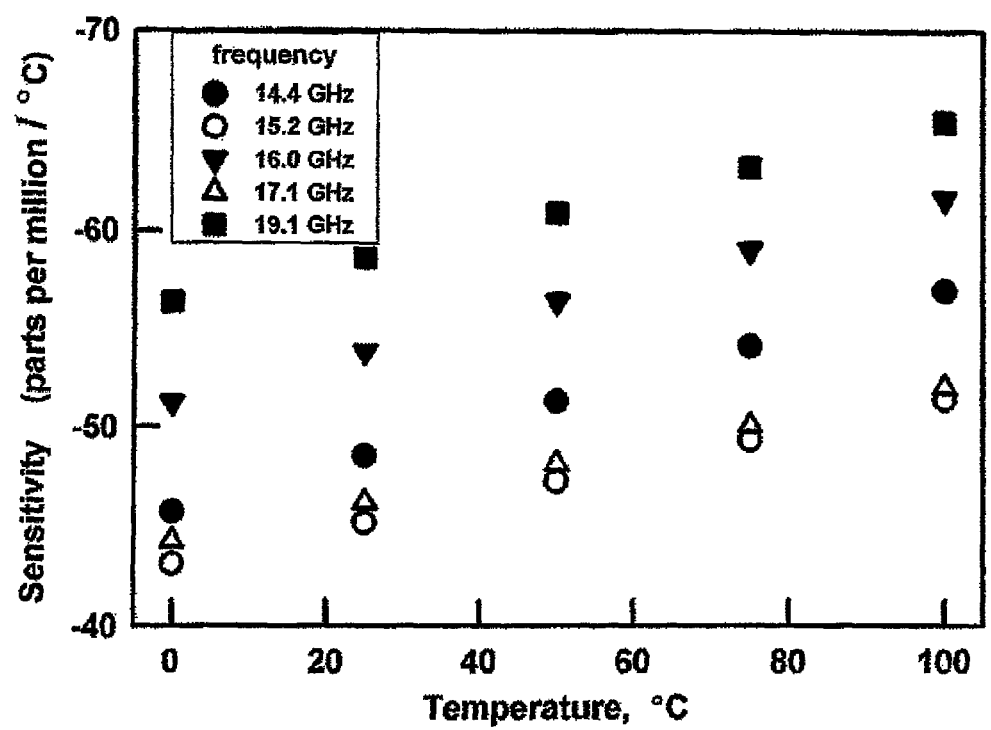
FIG. 17 is a diagram showing the relationship between temperature in the range of 0° C. to 100° C. and frequency sensitivity for several exemplary modes.

FIG. 17 is a diagram showing the relationship between temperature in the range of 0° C. to 100° C. and frequency sensitivity in parts per million per ° C. for several exemplary modes. The fractional change in frequency can be measured due to the high Q factor. It can also be seen that the resonant modes with higher frequencies are more sensitive to temperature change.

Figure 18:
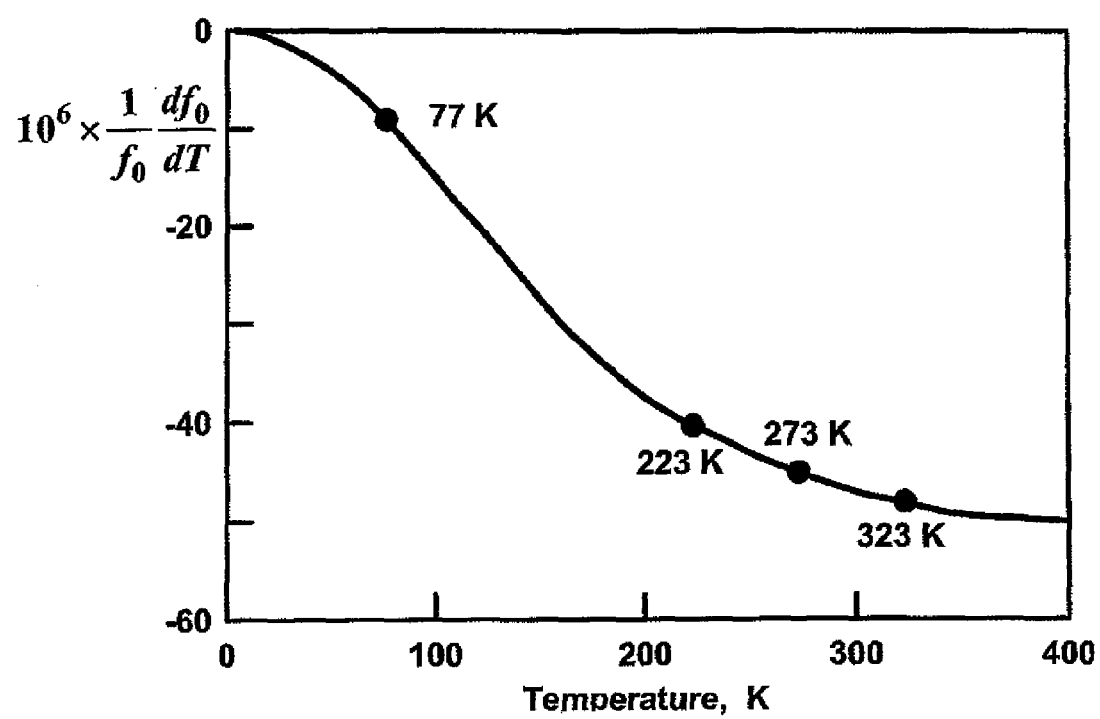
FIG. 18 is a graph illustrating the relationship between temperature in the range of 0 K to 400 K and frequency sensitivity for an exemplary mode.

FIG. 18 is a diagram showing the relationship between temperature in the range of 0 K to 400 K and frequency sensitivity for an exemplary mode. As can be seen from FIG. 18, for the mode depicted, frequency sensitivity decreases gradually as temperature increases.

Figure 19:
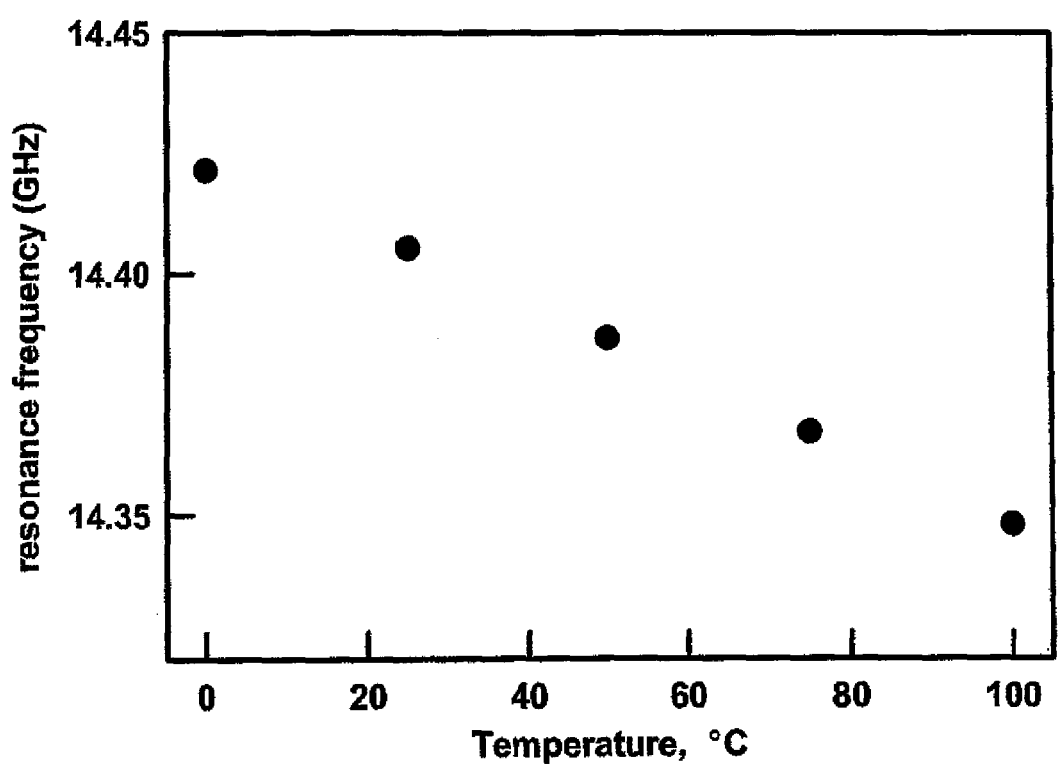
FIG. 19 is a diagram showing a fractional change in resonant frequency in GHz as it relates to temperature in the range of 0° C. to 100° C.

FIG. 19 is a diagram showing fractional change in resonant frequency as it relates to temperature in the range of 0° C. to 100° C. for an exemplary mode. As can be seen from FIG. 19, the resonant frequency changes by about 0.07 GHz over the entire temperature range. FIGS. 18 and 19 represent exemplary temperature versus frequency models, as described above. The temperature versus frequency models are determined using known algorithms and equations that account for changes in permittivity, thermal expansion, frequency characteristics, spurious modes, etc.

Figure 20:
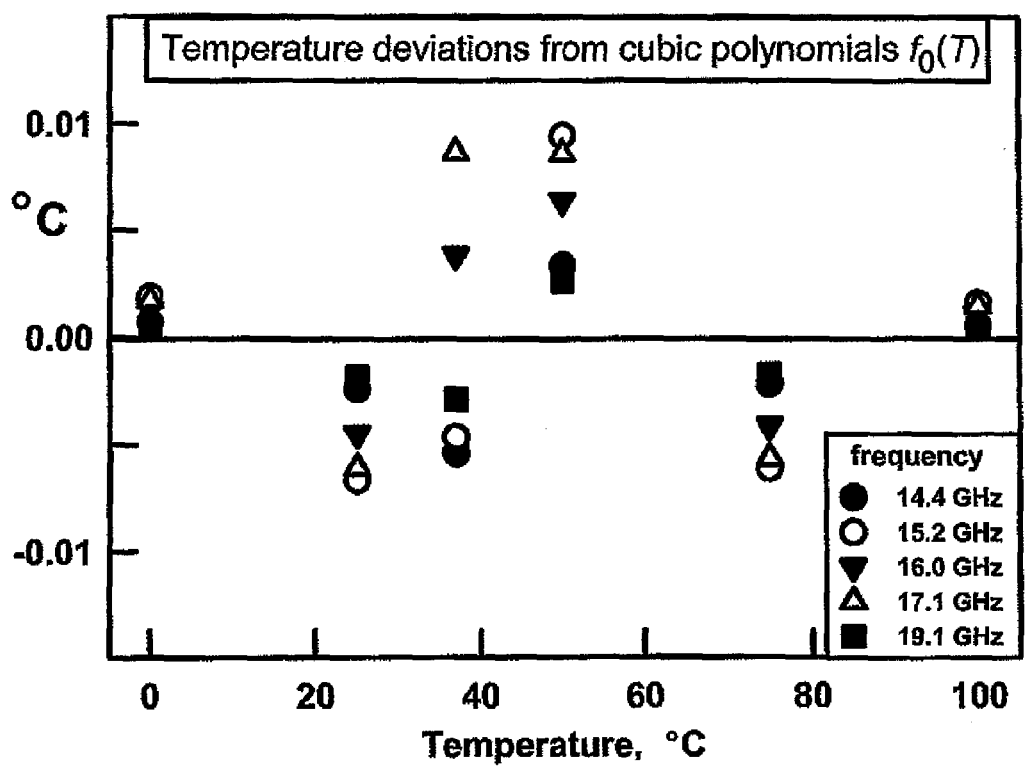
FIG. 20 is a diagram showing the temperature deviation of measured results from a frequency versus cubic temperature function for several different modes.

FIG. 20 is a diagram showing the temperature deviation of measured results from a cubic frequency versus temperature function for several different modes. As can be seen from FIG. 20, the deviation function can be approximated by a cubic function. The coefficients of the cubic deviation reference function can be calculated when the thermometer is calibrated. Once the deviation function is obtained, the temperature can be measured accurately using the temperature versus frequency model and the corresponding deviation function.

Figure 21:
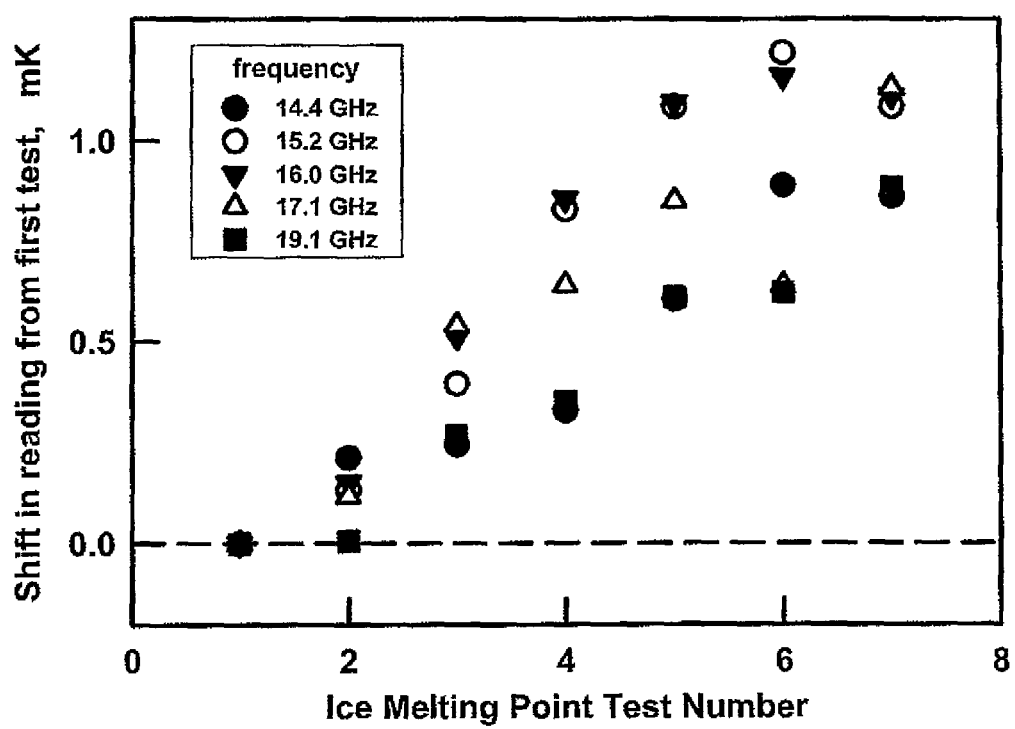
FIG. 21 is a diagram showing experimental results for ice melting point repeatability experiments for several different modes.

FIG. 21 is a diagram showing experimental results for ice melting point repeatability for several different modes. As shown in FIG. 21, 0° C. repeatability measurements were determined by thermally cycling between ambient and 0° C. seven times. The test data represented in FIG. 21 shows that the amount that the temperature measurement drifted each time the temperature was measured between thermal cycles was minimal. For example, for the mode centered around 17.1 GHz, the temperature drifted about 0.5 mK between measurement number 1 and measurement number 3.

Figure 22:
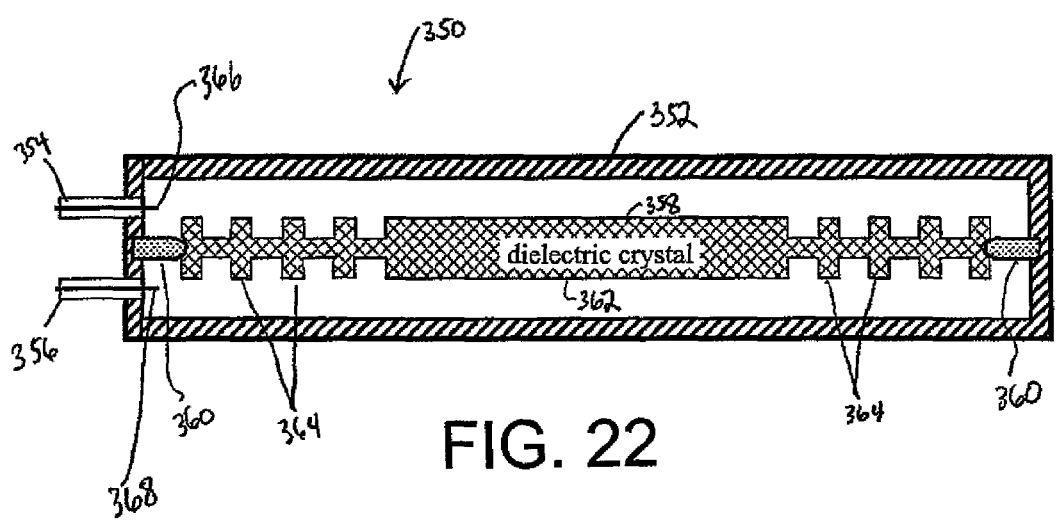
FIG. 22 is a fragmentary cross-sectional view a notched reflector dielectric resonator according to yet another embodiment of the present invention.

FIG. 22 shows a notched reflector dielectric resonator 350 according to yet another embodiment of the present invention. The resonator 350 includes a cylindrical casing 352 with input and output waveguides 354 and 356, respectively, coupled thereto. A dielectric crystal 358 is supported within the casing 352 by support members 360. The dielectric crystal 358 includes an elongated central portion 362 and a plurality of resonant reflectors 364 that are formed directly into the dielectric crystal 364. Antennas 366 and 368 couple electromagnetic waves to and from the dielectric crystal 358 so that the wave resonates therein in a Bragg reflection mode. Similar to the other embodiments described above, the resonant frequency changes based on the temperature of the crystal 358. Accordingly, the change in resonant frequency can be used to calculate the temperature of the crystal 358. During operation, the electromagnetic wave is transmitted from the input antenna 366 to the dielectric crystal 352 so that the wave resonates back and forth among the reflectors 364 and the central portion 362. The wave is then output to the output antenna 368. The temperature measurement can be performed in a manner that is similar to the method(s) described above. In the present embodiment, resonant frequency values of about 9 GHz can be used, and a Q factor of about 100,000 can be obtained. Unlike the embodiments shown and described above, there is less crosstalk between spurious modes and whispering gallery modes. Additionally, due to the inherent cylindrical shape of the notched reflector resonator 350, a thermometer using the same may be made smaller.

Although the dielectric resonators described above have been described as being used as a thermometer, it should be understood that dielectric resonators can be used to measure other environmental factors, such as humidity. Because humidity also affects the permittivity of a dielectric, the resonant frequency of the dielectric resonator can also be used to detect humidity. Thus, the present invention may be more generally directed to a dielectric sensor in which a change in permittivity of the dielectric represents a change in an environment factor.

Although embodiments of the present invention have been shown and described, it will be appreciated by those skilled in the art that changes may be made in these embodiments without departing from the principles and spirit of the invention, the scope of which is defined in the appended claims and their equivalents.

We claim:

1. A thermometer, comprising:
a housing having at least one opening therein and an inner surface;
a dielectric element disposed in said housing, the dielectric element having an outer surface spaced from the inner surface of the housing to establish a cavity surrounding the dielectric element;
at least one microwave guide coupled to said at least one opening for providing a signal into said dielectric element for propagation at a resonant frequency around the outer surface of the dielectric element and for receiving the signal from said dielectric element; and
a temperature determination unit operatively associated with said housing for receiving the signal from said at least one microwave guide, measuring the resonant frequency of the dielectric element, and determining a temperature of the dielectric element based on a predetermined relationship between resonant frequency and temperature of the dielectric element.

2. The thermometer of claim 1, wherein said at least one microwave guide comprises:
an input microwave guide coupled to a first opening on said housing; and
an output microwave guide coupled to a second opening on said housing.

3. The thermometer of claim 1, wherein said cavity is cylindrical and said dielectric element comprises a disc centered in said cavity, the signal propagating around a circumference of the dielectric disc in a whispering gallery mode.

4. The thermometer of claim 2, further comprising:
a first antenna coupled to said input microwave guide, said first antenna being recessed in said first opening; and
a second antenna coupled to said output microwave guide, said second antenna being recessed in said second opening.

5. The thermometer of claim 4, wherein said first and second antennas extend into said cavity by less than one millimeter.

6. The thermometer of claim 1, wherein said housing comprises:
a casing portion defining a bottom wall and a side wall of said cavity, said bottom wall and side wall of said cavity defining an inner space;
an o-ring disposed, with or without an o-ring groove, on an upper edge of said side wall opposite from where said bottom wall meets said side wall; and
a plate portion defining a top wall of said cavity, said top wall arranged opposite to said bottom wall, and said plate portion being coupled to said casing portion with said o-ring arranged therebetween to seal the inner space.

7. The thermometer of claim 6, wherein:
the upper edge of said side wall includes a first plurality of fastening holes arranged therein;
the plate portion includes a second plurality of fastening holes arranged around a perimeter thereof, said second plurality of fastening holes arranged to correspond to the first plurality of fastening holes; and a plurality of fastening elements for securing the plate portion to the casing portion such that pressure is applied to the o-ring, each of said fastening elements disposed in said first and second fastening holes.

8. The thermometer of claim 6, wherein said o-ring is made of gold.

9. The thermometer of claim 5, wherein the resonant frequency is between 14 GHz and 20 GHz.

10. The thermometer of claim 1, wherein said housing comprises steel covered with gold.

11. The thermometer of claim 1, wherein said dielectric element comprises either sapphire or quartz.

12. The thermometer of claim 1, further comprising:
an inert gas disposed in said housing and surrounding said dielectric element.

13. The thermometer of claim 1, wherein:
said housing is formed of a thermally conductive material, said housing being formed with at least one recess;
said dielectric element is formed with at least one hole extending at least partially therethrough; and
said thermometer further comprises a pedestal support for engaging said at least one recess in said housing and said hole in said dielectric element to maintain said dielectric element in position in said housing such that heat is provided by the housing directly to the dielectric element via said at least one pedestal support.

14. The thermometer of claim 13, wherein:
said at least one recess formed in said housing has a first width;
said hole formed in said dielectric element has a second width different from the first width; and
said pedestal support includes an elongated member having a first portion of the first width to engage said at least one recess and a second portion of the second width to engage the hole in the dielectric element.

15. The thermometer of claim 1, further comprising:
a frequency source generating the signal at a reference frequency and providing the signal to said at least one microwave guide; and
a frequency synchronizer synchronizing the determined resonant frequency of the signal with the reference frequency.

16. The thermometer of claim 1, further comprising:
a frequency source generating a sweep signal about a predetermined resonant frequency, the sweep signal spanning a plurality of frequency values and being provided to the dielectric element; and
an amplitude and/or phase detection unit detecting a plurality of amplitude and/or phase changes between the signal provided to the dielectric element and the signal received from the signal received from the dielectric element at each of the frequency values,
wherein said temperature determination unit determines the frequency value having the largest amplitude increase or the largest rate of change of phase with frequency as the measured resonant frequency.

17. The thermometer of claim 1, wherein said temperature determination unit comprises:
an oscillator generating a reference signal of a predetermined frequency; and
a frequency counter receiving the reference signal and the signal from the at least one microwave guide, said counter determining the resonant frequency of the signal from the at least one microwave guide based on the reference signal.

18. The thermometer of claim 1, wherein:
the signal provided to said dielectric element comprises a first signal of a first predetermined mode and a first reference frequency combined with a second signal of a second predetermined mode and a second reference frequency;
said first and second signals propagate in said dielectric element at first and second resonant frequencies, respectively, the first and second resonant frequencies depending on a temperature of the dielectric element;
said signal received by the temperature determination unit comprises the combined first and second signals; and
said temperature determination unit measures the first resonant frequency of the first signal and the second resonant frequency of the second signal, calculates a ratio of the first and second resonant frequencies, and determines the temperature of the dielectric element based on a predetermined relationship between temperature of the dielectric element and the ratio of the first and second resonant frequencies, respectively.

19. The thermometer of claim 1, further comprising:
air disposed in said housing and surrounding said dielectric element.

20. A thermometer, comprising:
a housing having at least one opening therein and an inner surface;
a dielectric disc disposed in said housing, the dielectric disc having an outer surface spaced from the inner surface of the housing to establish a cavity surrounding the circumference of the dielectric element;
an input microwave guide coupled to said at least one opening, said input microwave guide providing a signal to said dielectric disc for propagation at a resonant frequency around a circumference of said dielectric disc, the resonant frequency depending on a temperature of the dielectric disc;
an output microwave guide coupled to said at least one opening, said output microwave guide receiving the signal from said dielectric disc; and
a temperature determination unit for receiving the signal from said output microwave guide, measuring a center frequency of the signal to determine the resonant frequency of the dielectric disc, and determining the temperature of the dielectric disc based on a predetermined relationship between resonant frequency and temperature of the dielectric disc.

21. A thermometer, comprising:
a housing having at least one opening therein and an interior surface;
a dielectric element disposed in said housing, the dielectric element having an outer surface spaced from the inner surface of the housing to establish a cavity surrounding the dielectric element;
at least one microwave guide coupled to said at least one opening for providing a signal into said dielectric element for propagation at a resonant frequency around the outer surface of the dielectric element and for receiving the signal from said dielectric element;
at least one antenna coupling the at least one microwave guide to said dielectric element; and
a temperature determination unit operatively associated with said housing for receiving the signal from said at least one microwave guide, measuring the resonant frequency of the dielectric element, and determining a temperature of the dielectric element based on a predetermined relationship between resonant frequency and temperature of the dielectric element.

* * * * *